United States Patent
Iwai et al.

(10) Patent No.: US 11,509,539 B2
(45) Date of Patent: Nov. 22, 2022

(54) TRAFFIC ANALYSIS APPARATUS, SYSTEM, METHOD, AND PROGRAM

(71) Applicant: NEC Corporation, Tokyo (JP)

(72) Inventors: Takanori Iwai, Tokyo (JP); Anan Sawabe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 186 days.

(21) Appl. No.: 16/758,209

(22) PCT Filed: Oct. 25, 2018

(86) PCT No.: PCT/JP2018/039653
§ 371 (c)(1),
(2) Date: Apr. 22, 2020

(87) PCT Pub. No.: WO2019/082965
PCT Pub. Date: May 2, 2019

(65) Prior Publication Data
US 2020/0328947 A1    Oct. 15, 2020

(30) Foreign Application Priority Data
Oct. 26, 2017  (JP) .............................. JP2017-207638

(51) Int. Cl.
*H04L 41/142*  (2022.01)
*H04L 1/00*    (2006.01)
(Continued)

(52) U.S. Cl.
CPC ............ *H04L 41/142* (2013.01); *H04L 1/002* (2013.01); *H04L 43/08* (2013.01); *H04L 47/24* (2013.01); *G16Y 10/75* (2020.01)

(58) Field of Classification Search
None
See application file for complete search history.

(56) References Cited

U.S. PATENT DOCUMENTS 6,246,985 B1   6/2001  Kanevsky et al.
6,774,917 B1 *  8/2004  Foote .................... G06F 16/738
                                        707/E17.028
(Continued)

FOREIGN PATENT DOCUMENTS

JP   2006-202015 A   8/2006
JP   2014-016731 A   1/2014
(Continued)

OTHER PUBLICATIONS

International Search Report for PCT Application No. PCT/JP2018/039653, dated Dec. 4, 2018.
(Continued)

*Primary Examiner* — Adnan Baig
(74) *Attorney, Agent, or Firm* — Sughrue Mion, PLLC

(57) ABSTRACT

A traffic analysis apparatus includes: a first means that estimates a state sequence from time-series data of communication traffic based on a hidden Markov model, and groups, into one group, a plurality of patterns with resembling state transitions in the state sequence to perform extraction of a state sequence, with taking the plurality of patterns grouped into one group as one state; and a second means that determines an application state corresponding to the time-series data based on the state sequence extracted by the first means and predetermined application characteristics.

14 Claims, 31 Drawing Sheets

(51) Int. Cl.
*H04L 43/08* (2022.01)
*H04L 47/24* (2022.01)
*G16Y 10/75* (2020.01)

(56) References Cited

U.S. PATENT DOCUMENTS

| | | | | |
|---|---|---|---|---|
| 2008/0319951 | A1* | 12/2008 | Ueno | G06F 16/285 |
| 2014/0222997 | A1* | 8/2014 | Mermoud | H04L 41/147 |
| | | | | 709/224 |
| 2015/0161518 | A1* | 6/2015 | McCann | G06N 7/005 |
| | | | | 706/12 |
| 2015/0363709 | A1* | 12/2015 | Kamei | G06K 9/6269 |
| | | | | 706/12 |
| 2017/0126579 | A1 | 5/2017 | Meng | |
| 2018/0053093 | A1* | 2/2018 | Olabiyi | B60W 40/09 |
| 2018/0213284 | A1* | 7/2018 | Shekhar | H04N 21/4532 |

FOREIGN PATENT DOCUMENTS

| | | |
|---|---|---|
| JP | 2015-222882 A | 12/2015 |
| JP | 2017-518711 A | 7/2017 |
| WO | 2011/158421 A1 | 12/2011 |

OTHER PUBLICATIONS

Matsubara Yasuko, Yasushi Sakurai, Christos Faloutsos, "Fully Automatic Mining of Large Time-series Datasets" Transactions of Information Processing Society of Japan: Database, vol. 7, No. 2, pp. 37-50, Jun. 2014, Japan.

Andrew W. Moore, Denis Zuev, "Internet Traffic Classification Using Bayesian Analysis Techniques," SIGMETRICS'05 (Proceedings of the 2005 ACM SIGMETRICS international conference on Measurement and modeling of computer systems), Jun. 6-10, 2005, Banff, Alberta, Canada.

JP Office Action for JP Application No. 2021-154149, dated Aug. 2, 2022 with English Translation.

* cited by examiner

301 :HMM aij: ROBABILITY OF TRANSITION FROM STATE i TO STATE j
(STATE TRANSITION PROBABILITY)

302: HIERARCHICAL MODEL θ OF HMM
303: GROUP 1
304: GROUP 2

δij: PROBABILITY OF TRANSITION FROM STATE (GROUP) θi TO STATE θj
(STATE TRANSITION PROBABILITY)

ak;ij: PROBABILITY OF TRANSITION FROM STATE i TO STATE j IN GROUP k(k=1,2)
(STATE TRANSITION PROBABILITY)

FIG. 11A
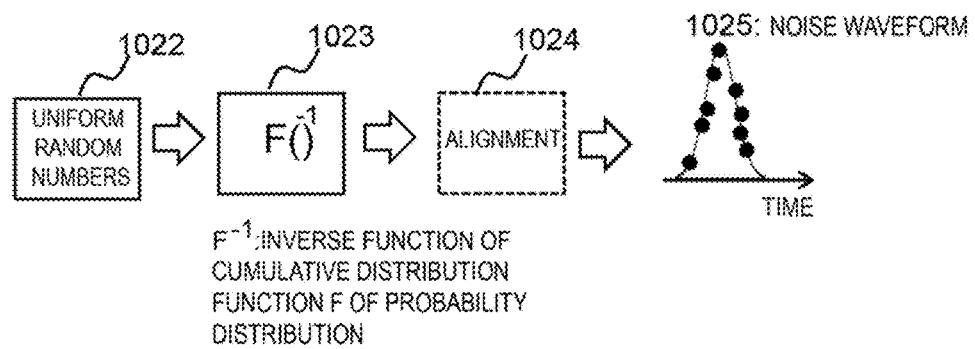
FIG. 11B
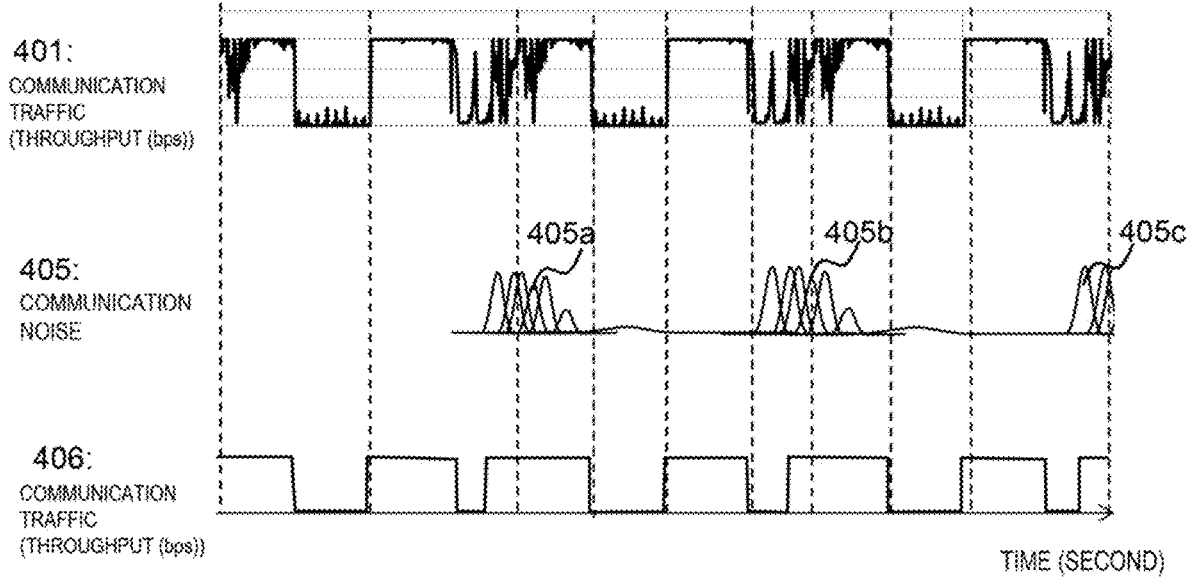
FIG. 11C

TRAFFIC ANALYSIS APPARATUS, SYSTEM, METHOD, AND PROGRAM

REFERENCE TO RELATED APPLICATION

This application is a National Stage Entry of PCT/JP2018/039653 filed on Oct. 25, 2018, which claims priority from Japanese Patent Application 2017-207638 filed on Oct. 26, 2017, the contents of all of which are incorporated herein by reference, in their entirety.

FIELD

The present invention relates to a traffic analysis apparatus, a system, a method, and a program.

BACKGROUND

Advancement in communication services has moved performance indicators (for example, key performance indicators (KPIs) of telecommunications operators from, for example, communication quality (quality of service: QoS) to application quality (for example, quality of experience (QoE) and quality of control (QoC)). For example, the International Telecommunication Union Telecommunication Standardization Sector (ITU-T) has formulated QoE for Web-browsing/moving images (Recommendation ITU-T G.1031).

It is supposed that in the future, more importance will probably be placed on network control and network design based on application quality. For example, the ITU-T has defined QoE for Web access (ITU-T Recommendation G.1030: Estimating end-to-end performance in IP networks for data applications) and moving image delivery (Recommendation ITU-T P.1203: Parametric bitstream-based quality assessment of progressive download and adaptive audiovisual streaming services over reliable transport). Much discussion has been made on control over a network (a networked system) in the field of machine control as well. For example, much discussion will probably be made on performance indexes (QoP: Quality of Performance and QoC) of machine control over a network.

For example, the recent wide spread of IoT (Internet of Things) where things are connected to the Internet, has been accompanied by more sophisticated needs by communication users on communication quality. For example, in a case of an IoT application (as well as a non-IoT application), its operation state could change. There is an IoT application that transmits video (moving image) data captured by an IoT sensor camera (a vehicle-mounted camera or the like) to a server (cloud) or the like, via a network along with navigation data, etc. The server analyzes the received data in real time, and the application performs remote control or remote support (for example, self-driving car or driving support) based on an analysis result. In this case, video delivery (real-time video delivery) may be performed in accordance with fluctuation of throughput or the like of the network. In addition, in a case of an object recognition application using a wearable camera, etc., a required throughput differs depending on whether a server that receives video data from the wearable camera and the wearable camera collaboratively perform object recognition or whether the wearable camera alone tracks a target object. In addition, when a drone-mounted camera as an IoT device relays aerial video in real time, a required throughput also differs depending on an operation mode, examples of which include an operation mode in which video is delivered from the drone, an operation mode in which flight information (the location information, the altitude, the acceleration rate information, etc.) of the drone is transmitted, and an operation mode in which commands are set in the drone. In a network (for example, a wireless network, a core network, or a wide area network (WAN)), various kinds of communication traffic such as for electronic mails, still images, moving images (videos), and voices (telephone calls) flow therethrough. These kinds of communication traffic are known to have different characteristics for each communication service.

In the future, a telecommunications operator would be required to address:

sophistication of needs of communication users for communication quality;

communication according to a requirement on a per application basis;

provision of communication services in response to ever-changing application use state and so forth.

Thus, it will be an issue for a telecommunications operator to grasp a change in an application state.

In order for a telecommunications operator to provide "optimum communication quality in response to ever-changing use condition (application state) and improve a satisfaction level (QoE: quality of experience) of a communication user, the telecommunications operator needs to achieve fine communication control. Thus, for example, the telecommunications operator needs to increase the number of control target parameters (for example, communication band and fluctuation (jitter, etc.) of transmission delay), and implement a fine control period.

However, there is a limit to information that can be acquired by a telecommunications operator (by a network equipment provided by the telecommunications operator, for example).

For example, due to an increase in encrypted traffic flowing through a network and diversification of traffic, there is a limit on a technology called deep packet inspection (DPI) for inspecting inside of traffic. In addition, in view of the Personal Information Protection Law, there is a possibility that use of the DPI itself will be prohibited. In view of encryption or privacy, contents of communication data cannot be observed.

For example, the following information can be acquired from traffic flowing through a network:

5-tuple (for example, source/destination Internet protocol (IP) addresses/ports and protocol)) and traffic patterns (for example, throughput, packet size, packet transmission interval, etc.).

A traffic flow is constituted by a group of packets having the same information in their respective IP header fields (a set of packets having the same pair of a destination IP address and port number and the same pair of a source IP address and port number). Traffic source address, traffic destination address, source port, destination port, and protocol number are referred to as "5-tuple".

The above network equipment that constitutes a network provided by the telecommunication operator does not have means for directly grasping what an application is used by a communication user (for example, terminal) and in what state an application is operating.

Traffic analysis based on machine learning is known to produce a lot of erroneous detection because of traffic noise. As one example of the traffic analysis based on machine learning, for example, NPL 2 discloses a technique in which a supervised naive Bayesian classifier is used to classify traffic per application category (per Transmission Control Protocol (TCP) connection). As an input, feature values (flow duration, TCP port, packet inter-arrival time (average, variance, etc.), payload size (average, variance, etc.), effective bandwidth based upon entropy, Fourier transform of packet inter-arrival time) that are obtained from a terminated TCP connection and category information of the communication performed in the corresponding TCP connection are used. As an output, for example, a classification result per application category (network traffic assigned to an individual category) is obtained. According to the disclosure of NPL 2, since the flow duration of a flow (TCP connection) is used, a connection needs to be terminated.

CITATION LIST

Patent Literature

PTL 1: Japanese Patent Kokai Publication No. JP2014-16731A

Non Patent Literature

NPL 1: Matsubara Yasuko, Yasushi Sakurai, Christos Faloutsos, "Fully Automatic Mining of Large Time-series Datasets" Transactions of Information Processing Society of Japan: Database, Vol. 7, No. 2, pp. 37-50, 2014, June
NPL 2: Andrew W. Moore, Denis Zuev, "Internet Traffic Classification Using Bayesian Analysis Techniques," SIGMETRICS'05 (Proceedings of the 2005 ACM SIGMETRICS international conference on Measurement and modeling of computer systems), Jun. 6-10, 2005, Banff, Alberta, Canada.

SUMMARY

As described above, there is a limitation on the information that can be acquired by the telecommunications operator (communication equipment). There is demanded a system which can realize provision of communication services that satisfy application quality (which may be abbreviated as "app quality") without inspecting a communication traffic.

For example, the present inventors have found that an estimation accuracy is low when a state of an application corresponding to a traffic flowing through a network is estimated from a throughput of the traffic.

Herein, a throughput of traffic is a data transfer amount on a per unit time (bits per second). It is noted that in 3.17 of RFC 1242 (Request for Comments: standards by the Internet Engineering Task Force (IETF), for example), "throughput" is defined as "The maximum rate at which none of the offered frames are dropped by the device". Basically, throughput does not deviate from this definition.

It has been found out that, when a state of an application is estimated, since various complex factors unpredictably fluctuates the time-series data (for example, a sudden drop in a throughput), the fluctuation of the time-series data is erroneously recognized, and hence an estimation accuracy is low.

This point is illustrated in FIG. 1. FIG. 1 illustrates a simulation result obtained by the present inventors. A throughput fluctuates due to various factors such as:
a fluctuation of a radio quality that occurs on a network, the fluctuation of the traffic amount, and
the cording method, the compression rate, etc. (traffic control on the application side).

In FIG. 1, a waveform represented by 201 is a diagram obtained by capturing packets flowing through a network interface (network interface card: NIC) and plotting a measurement result (time-series data) of the communication traffic (for example, throughput or the like) measured by extracting packets having, for example, the same source (or destination) IP address. In FIG. 1, a horizontal axis of 201 is time (for example, approximately 1,200 seconds from the beginning to the end of 201), and a vertical axis is throughput (for example, Megabits per second: Mbps). 202 schematically illustrates an example of an estimation result of an application state (for example, video delivery, telephone call, or the like), which is an application service (communication service) provided by the above communication traffic. The estimation result is obtained from the time-series data 201 of the communication traffic (for example, throughput). A horizontal axis of the waveform designated by 202 is a time axis common with that of 201. In addition, while not particularly limited thereto, the following description assumes that a state 0 on the vertical axis of 202 represents an application state A (video) and that a state 1 represents an application state B (telephone call) (application state may also be abbreviated as "app state"). In addition, 203 designates a sequence of the application state indicated by arrows given to the time-series data of the throughput of 201 (a correct state sequence). Namely, 203 represents a time-series pattern of the application state A (video delivery) and the application state B (voice telephone call).

In 202 in FIG. 1, for example, 202a, 202b, and 202c indicate erroneous state estimations based on fluctuation (communication noise) of the communication traffic (for example, a throughput). A cause of the erroneous estimations of states in FIG. 1 will be analyzed in detail below.

It is an object of the present invention to provide a system, an apparatus, and a method that reduce erroneous estimation to improve an estimation accuracy when estimating an application state based on a communication traffic.

According to an aspect of the present invention, there is provided a traffic analysis apparatus, including: a first means (a first unit) that estimates a state sequence from time-series data of communication traffic based on a hidden Markov model, and groups, into one group, a plurality of patterns with resembling state transitions in the state sequence to perform extraction of a state sequence, with taking the plurality of patterns grouped into one group as one state; and a second means (a second unit) that determines an application state corresponding to the time-series data based on the state sequence extracted by the first means (the first unit) and predetermined application characteristics.

According to an aspect of the present invention, there is provided a traffic analysis method, including:
estimating a state sequence from time-series data of communication traffic based on a hidden Markov model;
grouping, into one group, a plurality of patterns with resembling state transitions in the state sequence to perform extraction of a state sequence, with taking the plurality of patterns grouped into one group as one state; and
determining an application state corresponding to the time-series data based on the state sequence extracted and predetermined application characteristics.

According to an aspect of the present invention, there is provided a program, causing a computer to execute processing comprising:
estimating a state sequence from time-series data of communication traffic based on a hidden Markov model, and grouping, into one group, a plurality of patterns with resembling state transitions in the state sequence to perform extraction of a state sequence, with taking the plurality of patterns grouped into one group as one state; and determining an application state corresponding to the time-series data based on the state sequence extracted and predetermined application characteristics.

According to the present invention, there is provided a non-transitory computer-readable medium in which the above program is stored (for example, a semiconductor memory such as a random access memory (RAM), a read-only memory (ROM), or an electrically erasable and programmable ROM (EEPROM), a hard disk drive (HDD), a compact disc (CD), or a digital versatile disc (DVD)).

The present invention makes it possible to reduce erroneous estimation to improve an estimation accuracy, when estimating an application state based on communication traffic. Still other features and advantages of the present invention will become readily apparent to those skilled in this art from the following detailed description in conjunction with the accompanying drawings where only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 5A illustrates time-series of communication traffic, and FIG. 5B illustrates a discrete HMM, and FIG. 5C schematically illustrates an estimated state sequence.

FIGS. 11A to 11C are diagrams illustrating a communication noise calculation part according to the example embodiment 1 of the present invention.

DETAILED DESCRIPTION

Figure 31:
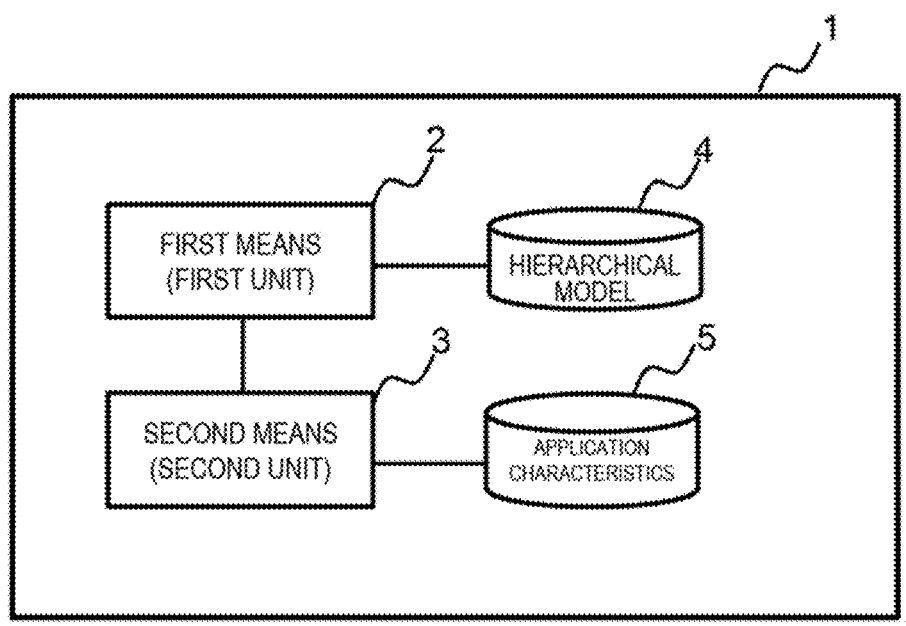
FIG. 31 is a diagram illustrating a basic embodiment of the present invention.

The following describes example embodiments of the present invention will be described. Referring to FIG. 31, a traffic analysis apparatus 1 according to an embodiment of the present invention includes a first means (a first unit) 2 that estimates a state sequence from time-series data of communication traffic based on a hierarchical hidden Markov model 4, groups a plurality of resembling patterns included in the state sequence (groups resembling patterns into one group) and extract a state sequence, taking the resembling patterns grouped as one state, and a second means (a second unit) 3 that matches the state sequence extracted by the first means (the first unit) 2 against application characteristics (application characteristics) 5 stored (registered) in advance in a storage and determines an application state(s) corresponding to the time-series data. When the traffic analysis apparatus 1 having this configuration according to one of embodiments of the present invention estimates an application state (an application type, an application operation mode (state), etc.) from the time-series data of the communication traffic, the traffic analysis apparatus 1 can reduce occurrence of erroneous estimations (202a, 202b, and 202c in FIG. 1) and can improve an estimation accuracy.

Hereinafter, a hidden Markov model (HMM), which is an underlying technique of the present invention, will be briefly described. A continuous HMM (which is also referred to as "a continuous density HMM") represents a symbol output probability by using a probability density function (p.d.f.), for example, a Gaussian distribution (Gaussian p.d.f.). The output of an individual state is a d-dimensional real-valued vector (d is a predetermined positive integer) in accordance with a probability density function.

Figure 2:
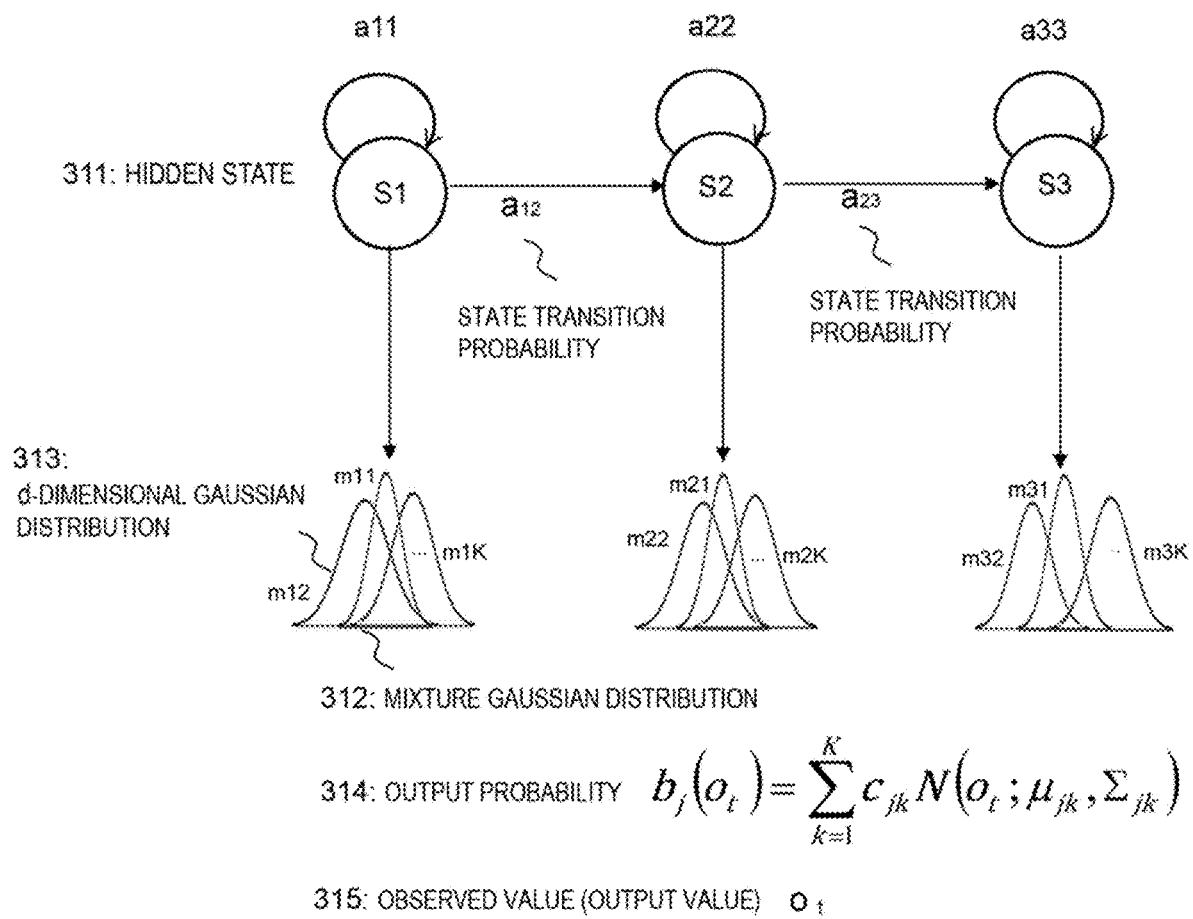
FIG. 2 is a diagram schematically illustrating a continuous mixture HMM.

FIG. 2 schematically illustrates a continuous HMM. Referring to FIG. 2, in the continuous HMM, the output of an individual state constitutes a subspace of an output space (d-dimensional space). The output probability of an individual state of a continuous mixture HMM is given as follows.

An observed value sequence O (the communication traffic in FIG. 1) is assumed to be composed by time-series data having a sequence length T.

$$O = [o_1, o_2, \ldots, o_T] \quad (1)$$

where $o_t$ is given by the following d-dimensional column vector (d≥1).

$$o_t = [x_1, x_2, \ldots, x_d]^T \quad (2)$$

In expression (2), T is a transpose operator.

An output probability distribution $b_j(o_t)$ in a state j (hidden state) is given by the following expression.

$$b_j(o_t) = \sum_{k=1}^{K} c_{jk} N\left(o_t; \mu_{jk}, \sum_{jk}\right) \quad (3)$$

$$c_{jk} > 0,$$

$$\sum_{k=1}^{K} c_{jk} =$$

where, K is the mixture number of the continuous mixture HMM, and N( ) is a multi-dimensional (d-dimensional) normal distribution.

$$N\left(o_t; \mu_{jk}, \sum_{jk}\right) = \frac{1}{(2\pi)^{\frac{d}{2}} \cdot |\Sigma_{jk}|^{\frac{1}{2}}} \exp\left[-\frac{1}{2}(o_t - \mu_{ij})^T \cdot \sum_{jk}^{-1} \cdot (o_t - \mu_{ij})\right] \quad (4)$$

In the expression (4), $\mu_{ij}$ is an average, and $\Sigma_{jk}$ is a d×d variance-covariance matrix.

It is assumed that model parameters of the continuous mixture HMM are expressed as follows.

$$\theta = \{(\pi_i, a_{ij}, c_{jk}, \theta_{jk}); i,j=1,\ldots,N, l=1,\ldots,K\} \quad (5)$$

In the expression (5), N is the number of states, and K is the mixture number.

πi is an initial state probability representing the initial state.

$a_{ij}$ is a transition probability with which the state exists in a state i at time t−1 and transitions to the state j at time t.

$c_{jk}$ is a mixture ratio of the kth probability distribution of the state j.

$\theta_{jk}$ is a parameter of the kth probability distribution of the state j (an average vector $\mu_{ik}$ and a variance-covariance matrix $\Sigma_{jk}$ Namely, $$\theta_{jk} = \{\mu_{ik}, \Sigma_{jk}\} \quad (6)$$

<EM Algorithm>

In the EM algorithm (expectation-maximization), assuming that an output (observed data) is x, non-observed data (missing data) (a state sequence in an HMM) is y, and model parameters are θ, in order to maximize a log likelihood of an observed value sequence by repeating an E (expectation) step and an M (maximization) step, the following steps 1 to 3 are included.

Step 1.

The initial parameters θ are set (time t=0).

Step 2.

An expected value about a conditional probability P(y|x, $\theta^t$) of a likelihood function is calculated based on a distribution of currently estimated parameters $\theta^t$ (E step).

$$Q(\theta|\theta^t) = \Sigma P(y|x, \theta^t) \log P(x, y|\theta) \quad (7)$$

Step 3.

Parameters that maximize the expected value $Q(\theta|\theta^t)$ of the likelihood calculated in E step are calculated (M step).

$$\theta^* = \mathrm{argmax} < \theta \leq Q(\theta|\theta^t) \quad (8)$$

The parameters θ* calculated in the M step are updated by using $\theta^{(t+1)}$ as time (t=t+1), and the above steps 2 and 3 are repeated until the expected value used to determine a latent variable distribution used in the next E step converges (stops increasing).

Assuming that an unknown state sequence S corresponding to the observed value sequence O is $S = \{s_1, s_2, \ldots, s_T\}$ (state $s_t \in \{1, \ldots, N\}$) and that an unknown probability density distribution sequence (distribution sequence) M of the observed value sequence O is $M = \{m_1, m_2, \ldots m_T\}$ ($m_t \in \{1, \ldots, K\}$), the state sequence S and the distribution sequence M correspond to the non-observed data (missing data) y of the EM algorithm. The log likelihood of complete data in relation to observed data O, non-observed data Y, and parameters θ is as follows.

$$p(O, S, M; \Theta) = \pi_i \prod_{t=1}^{T} a_{ij} \cdot c_{jk} \cdot N\left(o_t; \mu_{jk}, \sum_{jk}\right) \quad (9)$$

The expected value is given as follows.

$$Q(\Theta|\Theta^t) = \sum_S \sum_M p(S, M | O, \Theta^t) \log[p(O, S, M; \Theta)] \quad (10)$$

When the model parameters $\theta^{(t-1)}$ and the observed value sequence O are given, a posterior transition probability distribution $\xi_{ij}(t)$ in which the state exists in the state i at time t−1 and moves to the state j at time t is expressed as follows by using a forward algorithm and a backward algorithm.

$$\xi_{ij}(t) = p(s_{t-1} = i, s_t = j | O; \Theta^{(t-1)}) = \frac{\alpha_i(t-1) \cdot a_{ij} \cdot b_j(o_t) \cdot \beta_j(t)}{\sum_{i=1}^{N} \sum_{j=1}^{N} \alpha_i(t-1) \cdot a_{ij} \cdot b_j(o_t) \cdot \beta_j(t)} \quad (11)$$

A posterior probability distribution $\zeta_j(t)$ in which the state exists in the state j at time t is expressed as follows.

$$\zeta_j(t) = p(s_t = j \mid O; \Theta^{(t-1)}) = \frac{\alpha_j(t) \cdot \beta_j(t)}{\sum_{i=1}^{N} \alpha_i(t) \cdot \beta_i(t)} \quad (12)$$

A posterior probability distribution $\gamma_{jk}(t)$ in which the state exists in the kth distribution of the state j at time t is expressed as follows.

$$\gamma_{jk}(t) = p(s_t = j, m_t = k \mid O; \Theta^{(t-1)}) = \quad (13)$$

$$p(m_t = k \mid s_t = j, O; \Theta^{(t-1)}) = \gamma_j(t) \cdot \frac{c_{jk} \cdot N\left(o_t; \mu_{jk} \cdot \sum_{jk}\right)}{\sum_{k=1}^{K} c_{jk} \cdot N\left(o_t; \mu_{jk} \cdot \sum_{jk}\right)}$$

By maximizing the above Q function regarding an individual parameter, the initial state probability $\pi i$, the state transition probability $a_{ij}$, the mixture ratio $c_{jk}$, $\theta_{jk} = \{\mu_{jk}, \Sigma_{jk}\}$, etc. are derived as follows (the derivation is well known), for example.

$$\hat{\pi}_i = \frac{\sum_{j=1}^{N} \xi_{ij}(1)}{\sum_{i=1}^{N}\sum_{j=1}^{N} \xi_{ij}(1)} \quad (14)$$

$$\hat{a}_{ij} = \frac{\sum_{t=2}^{T} \xi_{ij}(t)}{\sum_{t=1}^{T}\sum_{j=1}^{N} \xi_{ij}(t)} \quad (15)$$

$$\hat{c}_{jk} = \frac{\sum_{t=1}^{T} \gamma_{jk}(t)}{\sum_{t=1}^{T}\sum_{k=1}^{K} \gamma_{jk}(t)} \quad (16)$$

$$\hat{\mu}_{jk} = \frac{\sum_{t=1}^{T} \gamma_{jk}(t) \cdot o_t}{\sum_{t=1}^{T} \gamma_{jk}(t)} \quad (17)$$

$$\hat{\Sigma}_{jk} = \frac{\sum_{t=1}^{T} \gamma_{jk}(t) \cdot (o_t - \hat{\mu}_{jk}) \cdot (o_t - \hat{\mu}_{jk})^T}{\sum_{t=1}^{T} \gamma_{jk}(t)} \quad (18)$$

<Forward Algorithm>

The following expression (19) defines a probability distribution in which a partial observed value sequence $o_1, o_2, \ldots, o_t$ has been outputted until time t and a state is in the state i at time t, under a condition that a model $\theta$ and an observed value sequence O are given.

$$\alpha_i(t) = p(o_1, o_2, \ldots, o_t, s_t = i; \theta) \quad (19)$$

As is well known, this $\alpha_1(t)$ is calculated by the following forward algorithm, for example.

$$\alpha_i(1) = \pi_i b_i(o_i) \; 1 \leq i \leq N \quad (20)$$

$$\alpha_i(t) = \left[\sum_{i=1}^{U} \alpha_i(t-1) a_{ij}\right] b_i(o_t) \; 2 \leq t \leq T \; 1 \leq j \leq N \quad (21)$$

A probability distribution in which $o_1, o_2, \ldots, o_t$ have been observed at time t and the state currently is in the state i is given as follows.

$$p(O; \Theta) = \sum_{i=1}^{N} \alpha_i(T) \quad (22)$$

<Backward Algorithm>

A backward variable $\beta(t)$ is defined as a probability distribution in which an observed sequence $o_{t+1}, o_{t+2}, \ldots, o_T$ from time t+1 to time T are generated when the model $\theta$ is given.

$$\beta_i(t) = p(o_{t+1} o_{t+2} \ldots o_T, s_T = i; \Theta) \quad (23)$$

$$\beta_i(t) = \begin{cases} 0 & t = T_n \wedge i \notin F \\ \frac{1}{N_F} & t = T_n \wedge i \in F \\ \sum_{j=1}^{U} a_{ij} b_j(o_{t+1}) \beta_j(t+1) & 0 \leq t \leq T, \; 1 \leq j \leq N \end{cases} \quad (24)$$

In expression (24), F represents a group of final states, and $N_F$ represents the number of final states.

Figure 1:
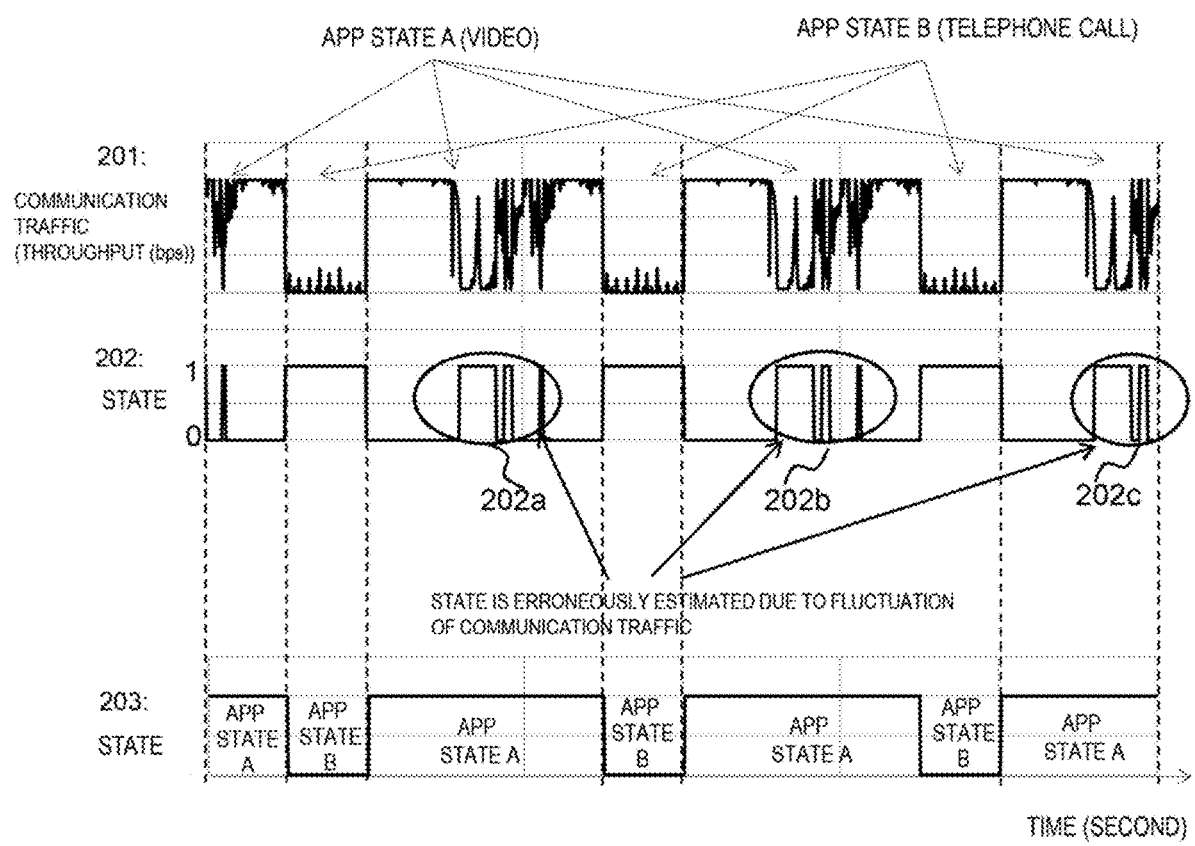
FIG. 1 is a diagram illustrating a prototype.

In the example in FIG. 1, sample traffic is caused to flow through a network, and a packet monitoring apparatus (a packet capture) measures the communication traffic (for example, throughput: data transfer amount per second). In addition, parameters of a continuous mixture HMM are estimated by using time-series data of the communication traffic (throughput) as an observed value sequence through the above EM algorithm (learning of the HMM model parameters).

$$\theta + \{(\pi_i, a_{ij}, c_{jk}, \theta_{jk}); i,j=1, \ldots, N, l=1, \ldots, K\} \quad (25)$$

A Viterbi algorithm calculates a state transition sequence indicating the highest likelihood of the output of an output sequence given by an HMM. An optimum state probability $\delta_i(t)$ is defined to obtain an optimum state sequence $S = s^1, s^2, \ldots, s^T$ with a model M that has generated an observed value sequence $O = o_1, o_2, \ldots, o_T$.

$$\delta_i(t) = \max_{<s_1, s_2, \ldots, s_{t-1}>} p(s_1, s_2, \ldots, s_t = i, o_1, o_2, \ldots, o_T \mid \theta) \quad (26)$$

The optimum state probability at time t can be recursively calculated as follows.

$$\delta_j(t) = \max_{<i>}[\delta_i(t-1) a_{ij}] b_j(o_t) \quad (27)$$

<Viterbi Algorithm>
Step 1.
Variables are initialized regarding the individual states i=1, . . . , N.

$$\delta_1(t) = \pi_i \times b_i(o_1),$$

$$\psi_1(i) = 0 (1 \leq i \leq N) \tag{28}$$

Step 2.
The recursive calculation is performed on the individual time t=1, . . . , T−1 and the individual state j=1, . . . , N.

$$\delta_{t+1}(j) = \max(1 \leq i \leq N)[\delta_t(i)a_{ij}]b_{ij}(o_{t-1})$$

$$\psi_{t+1}(j) = \operatorname{argmax}(1 \leq i \leq N)[\delta_t(i)a_{ij}] \tag{29}$$

Step 3.
The end of the recursive calculation (calculation of maximum probability value P and state transition sequence q at time t=T).

$$\hat{P} = \max(1 \leq i \leq N)[\delta_T(i)]$$

$$\hat{q}^T = \operatorname{argmax}(1 \leq i \leq N)[\psi_T(i)] \tag{30}$$

Step 4.
Restoration of the optimum state transition sequence by backtracking.
The following expression (31) is performed on the individual time t=T−1, . . . , 1.

$$\hat{q}^t = \psi_{t+1}(\hat{q}^{t+1}) \tag{31}$$

In the example in FIG. 1, the state transition sequence (202: state sequence) indicating the highest likelihood of the output of the time-series data of the given observed sequence (201: communication traffic (throughput)) is calculated by using the above continuous mixture HMM.

A hierarchical HMM (HHMM) may be used for the continuous mixture HMM. Regarding the hierarchical HMM, reference may be made to PTL 1, NPL 2, etc.

Figure 3A:
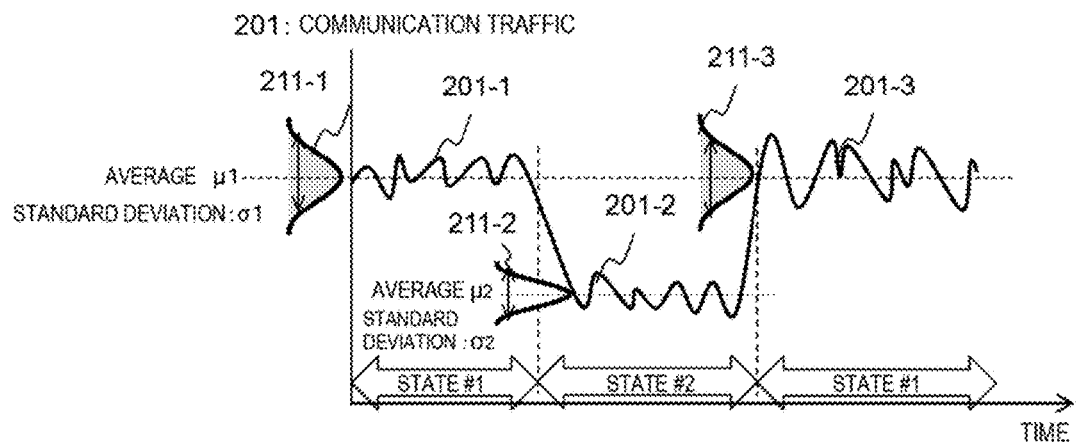
FIG. 3A is a diagram illustrating time-series data and distributions of communication traffic.

As schematically illustrated in FIG. 3A, in the continuous HMM, distributions of amplitude values (vertical axis in FIG. 3A) of the time-series data 201 (sections 201-1, 201-2, and 201-3) of communication traffic (for example, throughput) are represented as normal distributions 211-1, 211-2, and 211-3 (normal distributions 211-1 and 211-3 are the same distribution). Regarding the distributions of the amplitude values in the sections 201-1 and 201-3 of the time-series data, an average is denoted by $\mu_1$ and the standard deviation is denoted by Regarding the distribution of the amplitude values in the section 201-2 of the time-series data, the average is denoted by $\mu_2$ and the standard deviation is denoted by $\sigma_2$.

Figure 3B:
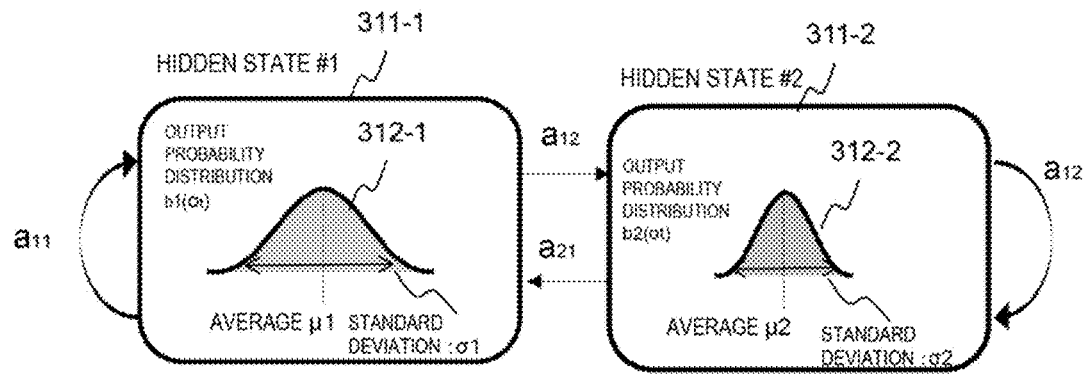
FIG. 3B is a diagram illustrating continuous HMM states (output probability distributions) and state transition probabilities.

FIG. 3B schematically illustrates a continuous HMM when a single normal distribution corresponds to a single state (for example, when the mixture number K in FIG. 2 is 1). In FIG. 3B, it is assumed that the time-series data of the communication traffic in FIG. 3A has been generated from normal distributions and that the generation source normal distributions are regarded as hidden states. An output probability distribution b1(ot) (a normal distribution) of a hidden state #1 is denoted by 312-1, and an output probability distribution b2(ot) (a normal distribution) of a hidden state #2 is denoted by 312-2. For simplicity sake, in FIG. 3B, each of the output probability distributions 312-1 and 312-2 of the hidden states is represented by a single one-dimensional (d=1 in expression (4)) normal distribution (K=1 in FIG. 2).

Figure 3C:
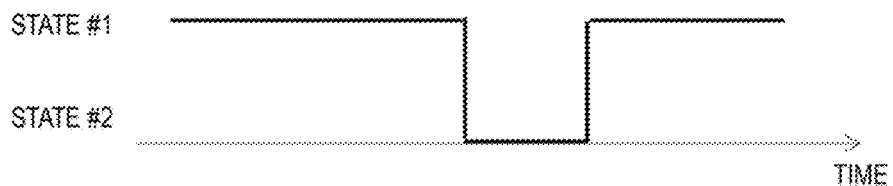
FIG. 3C is a diagram schematically illustrates an estimated state sequence.

FIG. 3C illustrates a state sequence estimated by using a continuous HMM on the communication traffic in FIG. 3A. The time-series data are quantized by using a normal distribution (a normal distribution from which the time-series data is obtained most probably is estimated, and discretization is performed by using state numbers (state names) corresponding to normal distributions of the generation source), and a fluctuation pattern per application type/state (application state A: video delivery, and application state B: voice telephone call, for example) is represented by a discrete value. In FIG. 3C, the temporal transition of the state estimated by using a continuous HMM on the time-series data 201 (sections 201-1, 201-2, and 201-3) of the communication traffic (for example, the throughput) is aligned with the time axis of the time-series data. In FIG. 3A, for example, the amplitude distributions in the sections 201-1 and 201-3 of the time-series data of the communication traffic fall within the same normal distribution 211-1. Thus, the sections 201-1 and 201-3 of the time-series data 201 can be considered to belong to the same state #1.

In contrast, the fluctuation (amplitude fluctuation) of the time-series data 201 of the communication traffic is large. For example, if the distribution in the section 201-1 of the time-series data does not fall within the normal distribution 211-1 and the fluctuation occurs over the range of the normal distribution 211-2, the estimated state fluctuates. If the fluctuation amplitude or the fluctuation number of the time-series data of the communication traffic becomes large, the state sequence estimated by using the continuous HMM on the time-series data of the communication traffic (for example, the optimum state transition sequence corresponding to the communication traffic (the throughput) obtained by the Viterbi algorithm) also changes (fluctuates) significantly. In the example in FIG. 1, since value 0 of the state 202 represents the application state (video) (for example, video transmission from a camera) and value 1 of the state 202 represents the application state (a telephone call) (for example, a voice telephone call between terminals), the states in the time intervals 202a, 202b, and 202c should actually be the application state (APP state) A (value=0) as illustrated in state 203. However, due to communication noise, etc., the time intervals representing the application state (APP state) B (value 1) are included. In addition, spike-like noise is also included in 202a, 202b, and 202c.

While the time-series data of throughput [bps (bit per second)] is illustrated as the time-series data of communication traffic, the time-series data is not limited to throughput. Examples of the time-series data include:
packet arrival interval (average value) [sec] per unit time,
average packet size (average value) [bytes] per unit time, and
number of packets per unit time. Alternatively, as an option,
for example, IoT-compliant time-series input information (time-series information about acceleration or change of radio quality) may also be used as the input information.
According to the present invention, first, a communication noise amount may be calculated and removed from the time-series data of the communication traffic to reduce the fluctuation of the state estimated by an HMM. Namely, the communication noise amount may be first removed from the time-series data of the communication traffic, and a state sequence may be extracted from the resultant time-series data by using an HMM.

According to the present invention, a state sequence is estimated by using a continuous HMM on the time-series data of communication traffic, and fluctuation patterns in which resembling state transitions are repeated are detected by using a discrete HMM. The fluctuation patterns having resembling state transitions are grouped into one state of the discrete HMM. Thus, for example, such situations where the communication traffic exhibits erratic fluctuations can be grouped as one state of the upper layer (the discrete HMM).

Figure 4A:
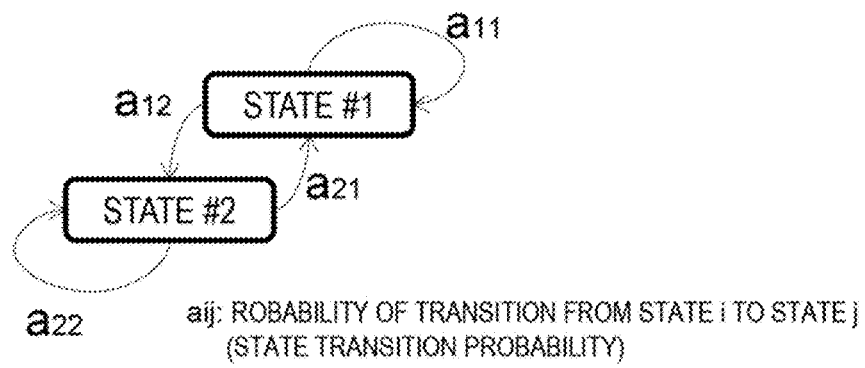
FIGS. 4A and 4B are diagrams illustrating hierarchical model according to a mode of the present invention.
Figure 4B:
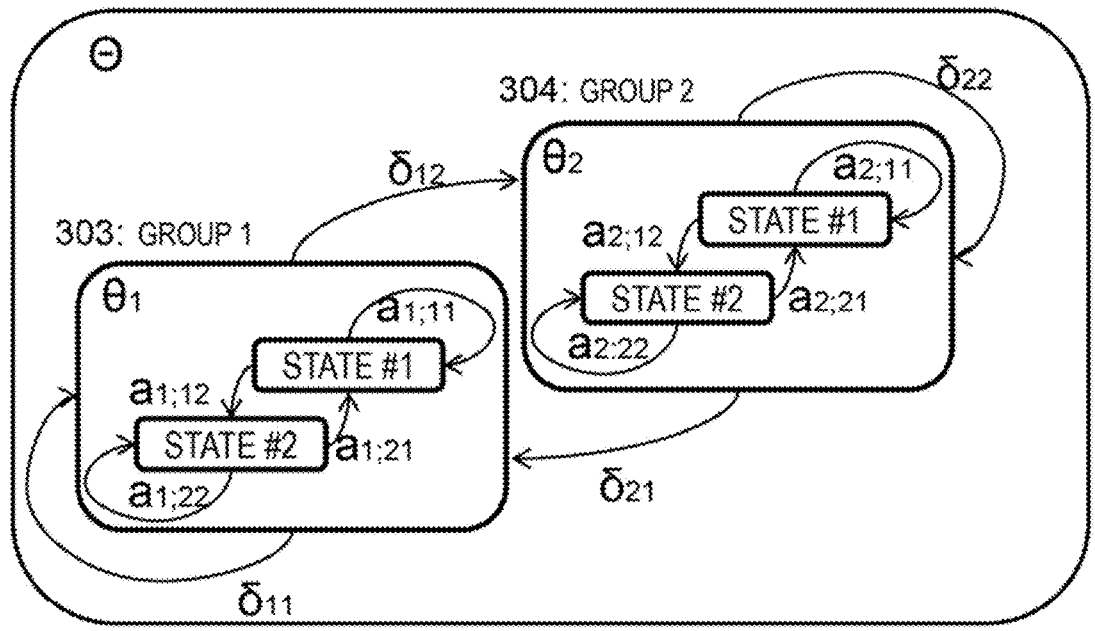

FIGS. 4A and 4B illustrate HMM model structures used in the present invention. 301 in FIG. 4A schematically illustrates an example of a model structure of a normal HMM, and 302 in FIG. 4B schematically illustrates an example of a model structure of a hierarchical model. While an example in which the hierarchical model 302 includes two groups 1 and 2 (303 and 304) is illustrated, the number of groups is not limited to 2. The hierarchical model 302 may course include three or more groups.

In NPL 1, the hierarchical model 302 in FIG. 4B is referred to as a "multi-level chain model", and an individual group is referred to as a "regime". In the groups 1 and 2, for simplicity, the number of states of the state transition model is set to 2. The number of groups is not of course limited to 2. The number of states of the state transition model is not limited to 2.

Each of the groups holds transition matrixes A1 and A2 between states (the state transition probabilities based on the individual (i,j) elements are a1;ij and a2;ij (i,j=1,2)) and a 2×2 transition matrix Δ between groups (regimes) (the state transition probabilities based on (u,v) elements: δuv (u,v=1, 2)).

For example, based on the model parameters $\{\theta_1, \theta_2 \Delta\}$ of the groups, sequence cut points are detected. According to NPL 1, the partial sequences obtained by the division based on these cut points are also referred to as "segments". A group of segments is similar time-series patterns. In FIGS. 4A and 4B, the HMMs of the individual groups 1 and 2 may be continuous HMMs, continuous hierarchical HMMs, discrete HMMs, or discrete hierarchical HMMs.

In addition, as disclosed in NPL 1, an optimum number of segments and an optimum number of groups (regimes) may be calculated based on a cost function.

Figure 5A:
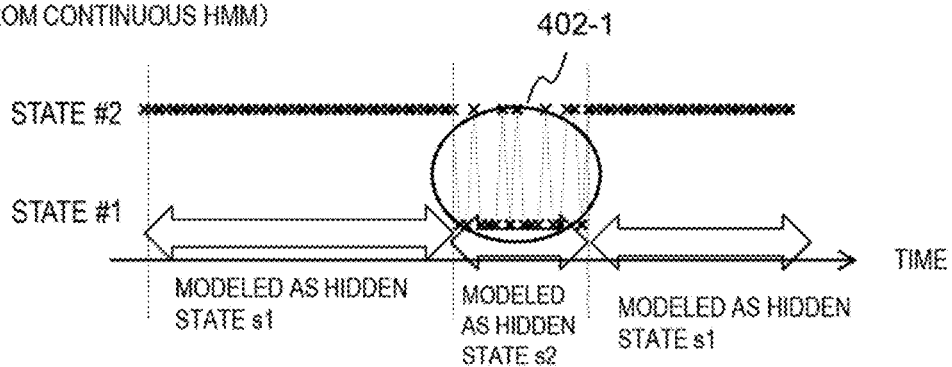
FIGS. 5A to 5C are diagrams illustrating a mode of the present invention.
Figure 5B:
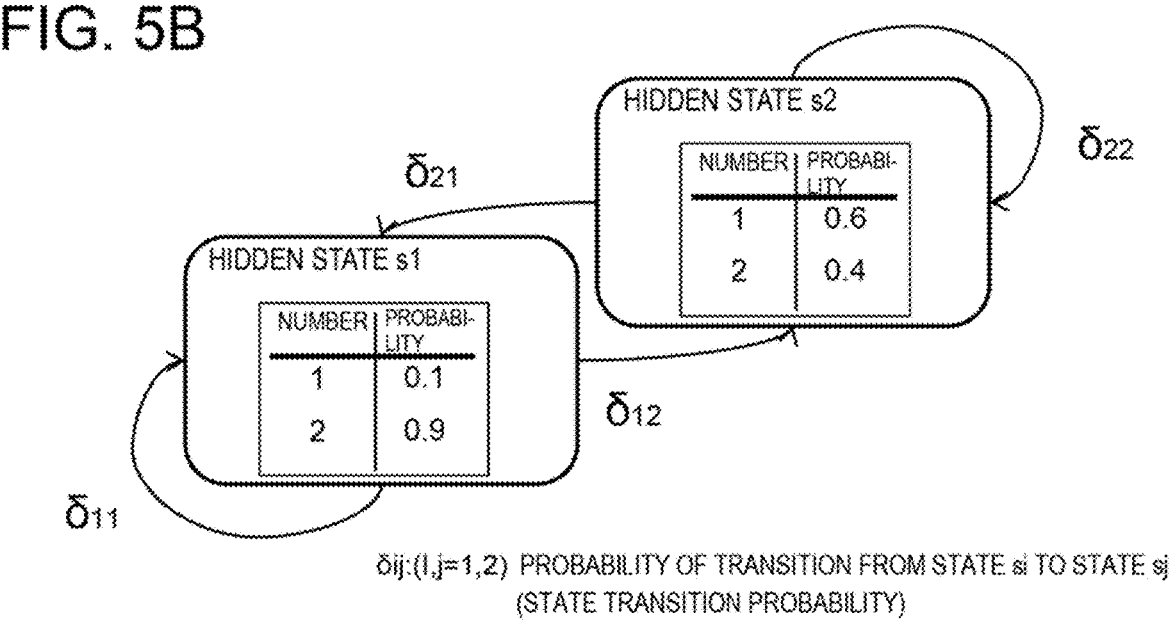
Figure 5C:
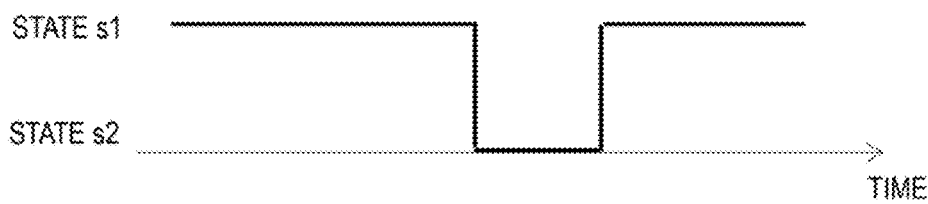

FIG. 5A to FIG. 5C illustrate the present invention. FIG. 5A illustrates a state sequence estimated by using a continuous HMM on communication traffic and corresponds to the state sequence in FIG. 3C. While not particularly limited, a state #1 corresponds to 0 and a state #2 corresponds to 1 in the state sequence in the FIG. 5A.

In, FIG. 5B, a discrete HMM is applied to the state sequence in FIG. 5A (a state sequence estimated based on a continuous HMM), resembling patterns are found, the resembling patterns are grouped into one group (corresponding to 303 or 304 in FIG. 4B, for example) and the resembling patterns are modeled as a single hidden state of the discrete HMM. Though not particularly limited thereto, in the example in FIG. 5B, an output probability of a hidden state s1 is as follows:
a probability with which number 1 (corresponding to the state #1 in FIG. 5A) is outputted, is 0.1; and
a probability with which number 2 (corresponding to the state #2 in FIG. 5A) is outputted, is 0.9.
An output probabilities of a hidden state s2 are as follows:
a probability with which number 1 (corresponding to the state #1 in FIG. 5A) is outputted, is 0.6; and
a probability with which number 2 (corresponding to the state #2 in FIG. 5A) is outputted, is 0.4.
$\delta_{ij}$(i,j=1,2) is a transition probability from a state $s_i$ to a state $s_j$.

FIG. 5C illustrates an example in which, from the time-series data of the discrete values (the state numbers) in FIG. 5A, patterns having similar state fluctuations are grouped as a single group (state) by a discrete HMM. Namely, in the example in FIG. 5C, the similar fluctuation patterns in the state sequence in a time interval 402-1 in FIG. 5A (fluctuations between the state #1 and the state #2 (five fluctuation patterns with state transitions similar to state #1→state #2→state #1) are schematically represented by five triangular waves) are grouped together into a single group and are modeled as the state s2 of the discrete HMM. As described above, in the state s2, the output ratio between number 1 and number 2 (state #1 and state #2) (the rate between the output probability values) is 3:2. The transition patterns between the states #1 and #2 in the time interval 402-1 in FIG. 5A corresponds to, for example, self-transition of the grouped state s2 and output of number 1 or 2 based on the corresponding output probability of the state s2 per transition. Thus, the transition patterns can be regarded as the transitions between the state #1 and the state #2.

The state sequence in FIG. 5C illustrates that the communication noise (the fluctuations between the state #1 and the state #2) in the time interval 402-1 in the sequence of the state 402 (the state estimated by using a continuous HMM) in FIG. 5A can be removed by using a discrete HMM.

Figure 6:
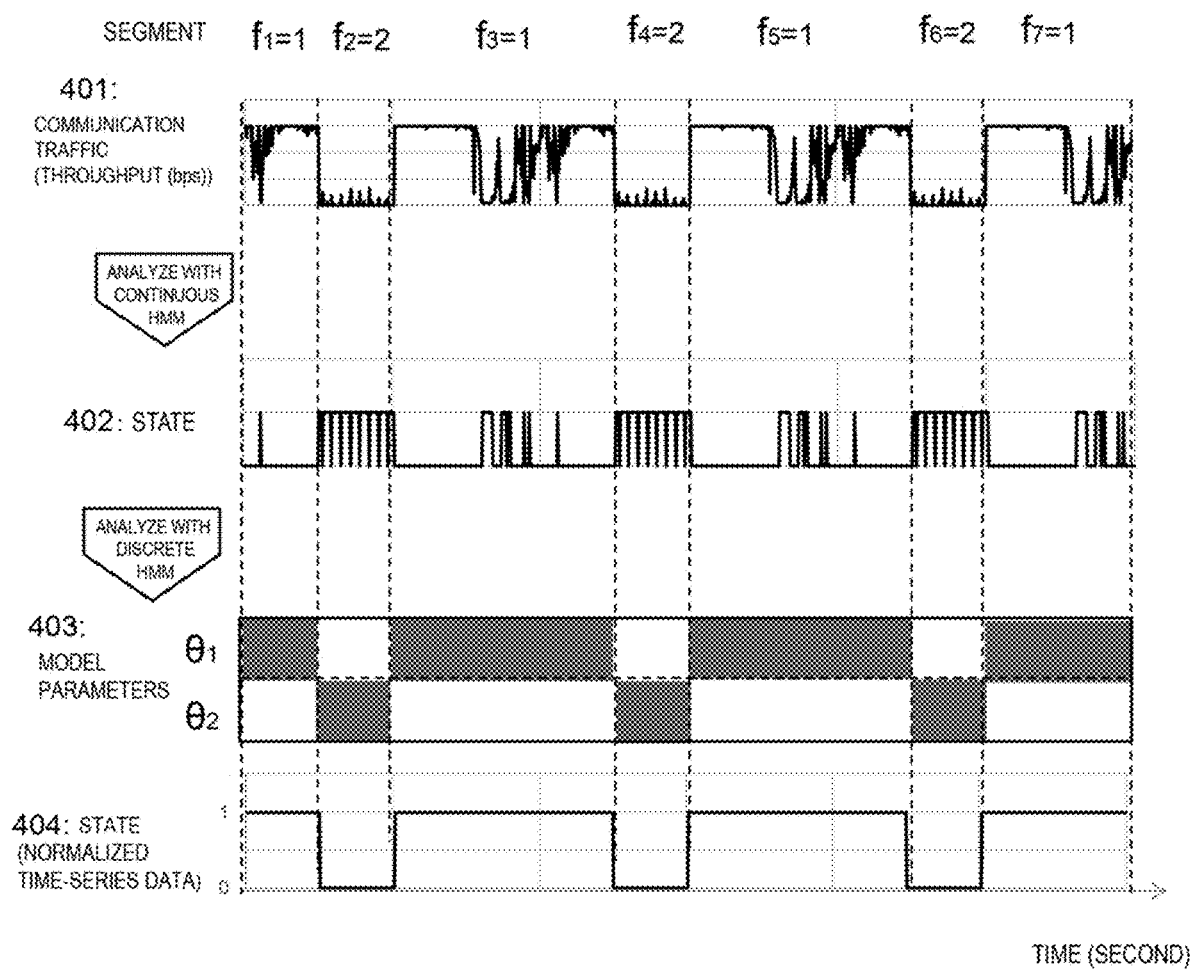
FIG. 6 is a diagram illustrating processing of a hierarchical model according to a mode of the present invention.

FIG. 6 illustrates a mode of the present invention, and in this mode, the number r of groups is 2 and the number m of sections (segments) is 7. In accordance with NPL 1, the individual segment is a section defined by cut points of a pattern of time-series data, for example. In FIG. 6, $f_1=2$ represents that the first segment member (first segment) belongs to group (regime) 2. Communication traffic (for example, the throughput) 401 is the same time-series data as that of the communication traffic 201 in FIG. 1. In addition, 402 is a state sequence estimated by using a continuous HMM on the time-series data 401 of the communication traffic (the throughput). Model parameters 403 (model parameters of groups 1 and 2) in FIG. 6 correspond to 302 in FIG. 4B and are given as follows.

$$\theta_1 = \{\pi_1, A_1, B_1\},$$

$$\theta_2 = \{\pi_2, A_2, B_2\} \tag{32}$$

Herein, $\pi_i$ (i=1,2) represents initial probabilities, $A_i$(i=1,2) represents transition probabilities, and $B_i$(i=1,2) represents output probabilities. In addition, 404 represents temporal transition of the estimated state. Value 0 of the state 404 represents an application state A (video), and value 1 represents an application state B (telephone call). The temporal transition of the state 404 is the same as that of the state 203 in FIG. 1, and it is seen that the application state has accurately been estimated.

While FIG. 6 illustrates the time-series data of the throughput as the time-series data of communication traffic, the application state per segment may be estimated by using a hierarchical model on a plurality of time-series data whose attributes are different from each other (for example, four kinds of time-series data), such as the throughput, the packet size, the packet frequency, and the packet transmission interval on the same time axis regarding the same communication traffic.

Figure 7:
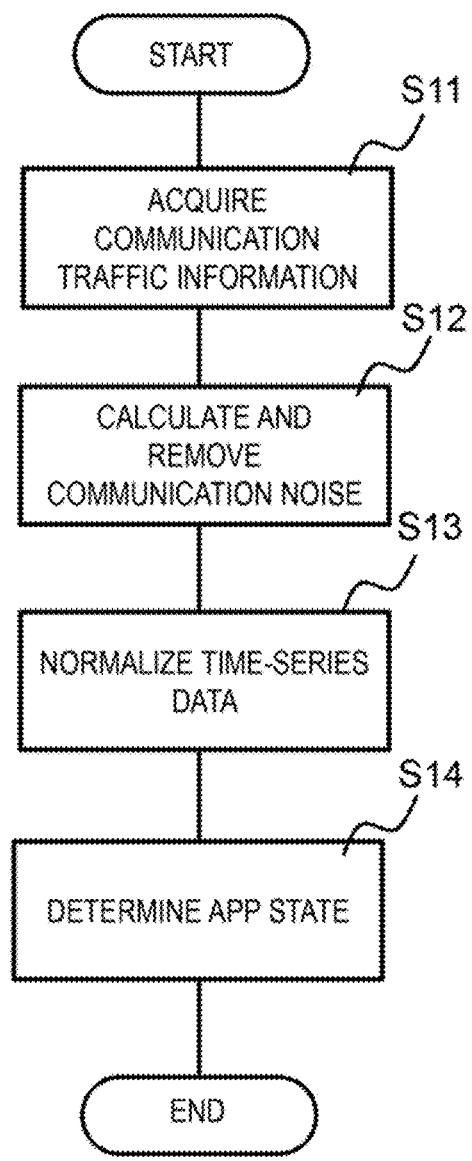
FIG. 7 is a flowchart illustrating a processing procedure according to a mode of the present invention.

FIG. 7 is a flowchart illustrating an operation example of the traffic analysis apparatus according a mode of the present invention.

Information on communication traffic to be analyzed (for example, a feature value such as throughput) is acquired (step S11). As described above, the information on the communication traffic may be packet arrival interval (average value) [sec] per unit time, average packet size (average value) [bytes] per unit time, number of packets per unit time, etc.

Communication noise is calculated and removed from the time-series data of the communication traffic (for example, a feature value such as throughput) (step S12).

Based on a hierarchical HMM, a state sequence is extracted from the time-series data of the communication traffic (throughput), resembling patterns are grouped together into a single state, and normalization processing is performed on the resultant state sequence (step S13).

The normalized state sequence is matched against application characteristics stored in advance to determine an application state corresponding to the time-series data of the communication traffic (the throughput) (step S14).

In the above, an example of a typical operating principle according to an embodiment of the present invention has been described. Next, an example embodiment of the present invention will be described.

Figure 8A:
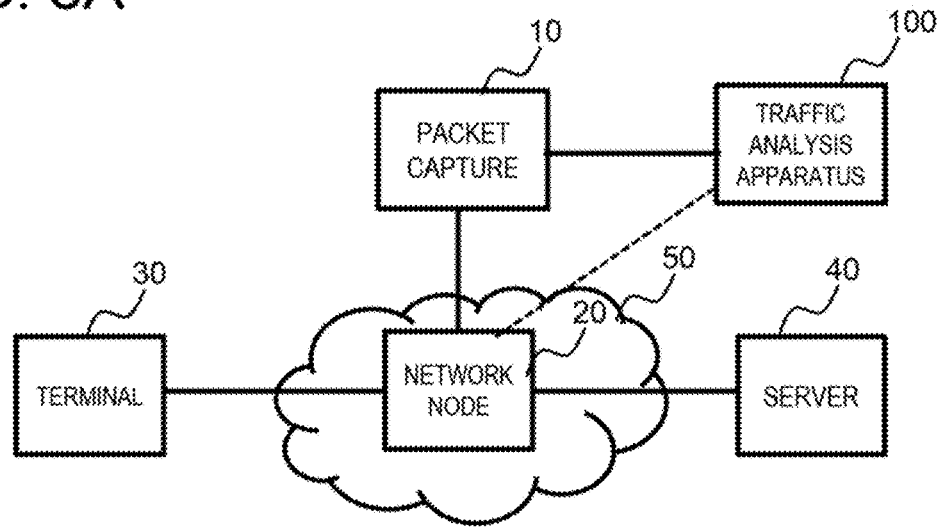
FIGS. 8A to 8C are diagrams illustrating system configuration examples according to a mode of the present invention.
Figure 8B:
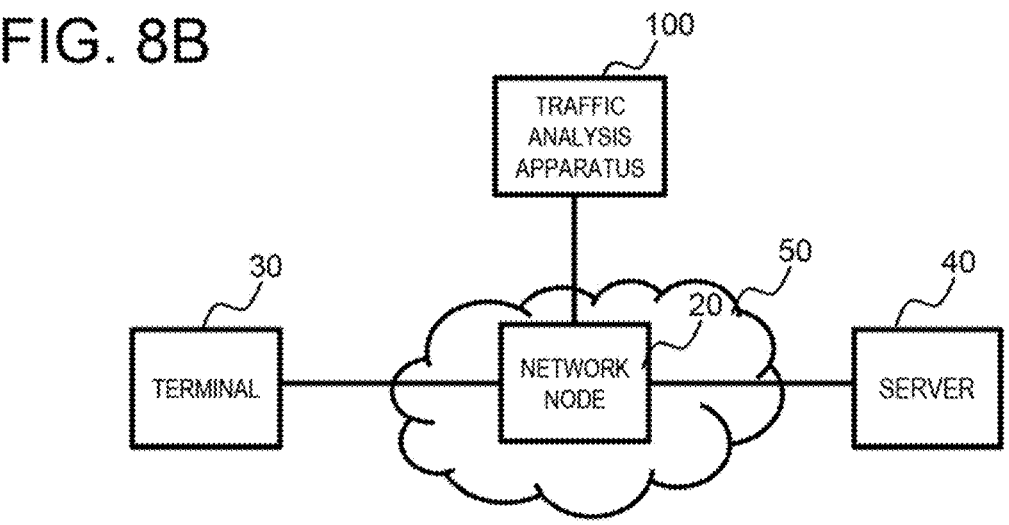
Figure 8C:
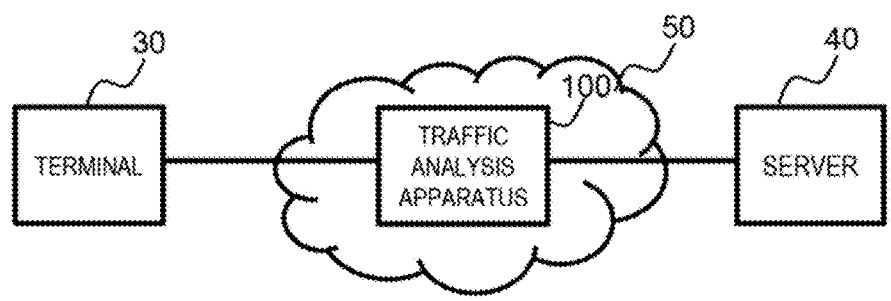

FIGS. 8A to 8C illustrate system configuration examples according to an example embodiment of the present invention. In FIG. 8A, a packet capture (a packet monitor) 10 captures an individual packet (frame) as a Protocol Data Unit (PDU) flowing through a network and analyzes the header, etc. of each packet. For example, the packet capture 10 analyzes the source address, the destination address, the port, the length (a packet size), the packet frequency, and the packet transmission time interval of each packet. The PDU is referred to as a "frame" in the data link layer (layer 2 (L2)) and a "packet" in the network layer (layer 3(L3)) of the OSI (Open Systems Interconnection) reference model of the ISO (International Organization for Standardization).

The packet capture 10 (also referred to as "a packet monitor") is connected to a network node 20 (for example, a relay apparatus such as a router (an L3 switch)) or the like arranged in a communication network 50 and captures packets flowing through the communication network 50, for example, packets exchanged between a terminal 30 and a server 40.

In the network node 20, by performing mirroring of at least one port (duplication source port) to be monitored on at least one port (duplication destination ports) to which the packet capture 10 is connected, the packet capture 10 can monitor all packets (transmitted packets and received packets) passing through the at least one port (duplication source port) of the network node (switch) 20. The packet capture 10 sets a network interface card (NIC) to a promiscuous mode so that signals which are not data packets addressed to the packet capture 10, are also captured. The packet capture 10 only needs to refer to the destination and source IP addresses, etc. of the packets. Thus, the communication traffic, including a request header, etc., may be encrypted.

In FIG. 8A, the network node 20 may be a gateway node in a core network or a base station in a radio access network, for example. A traffic analysis apparatus 100 acquires the time-series data of communication traffic (throughput) between a terminal and a server or between terminals calculated by the packet capture 10 and analyzes the traffic. This traffic analysis apparatus 100 corresponds to the traffic analysis apparatus 1 in FIG. 31. The traffic analysis apparatus 100 may be implemented on a cloud server or the like (not illustrated) connected via the communication network 50.

FIG. 8B illustrates a configuration in which the packet capture 10 in FIG. 8A is implemented in the traffic analysis apparatus 100. Namely, the packet capture 10 and the traffic analysis apparatus 100 are implemented integrally.

Alternatively, as illustrated in FIG. 8C, the packet capture 10 and the traffic analysis apparatus 100 may be implemented on a node in the communication network 50 (for example, a relay apparatus such as a router, a radio base station, a Mobile Edge Computing (MEC) server, a gateway or a server on a core network, etc.).

Alternatively, by implementing the packet capture 10 and the traffic analysis apparatus 100 on the terminal 30 or the server 40 communicating with the terminal 30, the packets that flows to the terminal 30 or the packets that are transmitted from the terminal 30 to the server 40 may be captured, and the traffic may be analyzed. In FIGS. 8A to 8C, the communication network 50 may provide the voice telephone call service (Voice Over IP, for example) between terminals.

Example Embodiment 1

Figure 9:
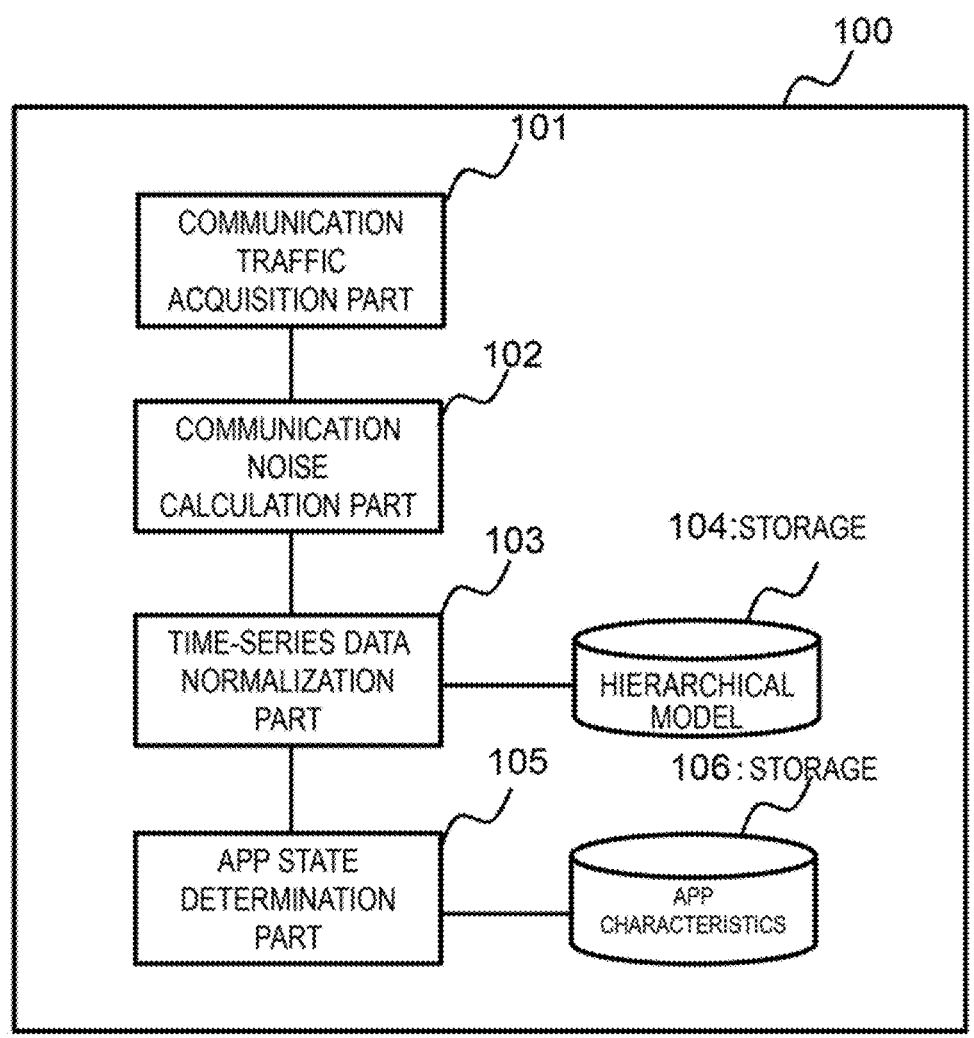
FIG. 9 is a diagram illustrating a configuration example of a traffic analysis apparatus according to an example embodiment 1 of the present invention.

FIG. 9 illustrates an example of a configuration of a traffic analysis apparatus 100 described with reference to FIGS. 8A to 8C. The traffic analysis apparatus 100 performs stochastic computation of fluctuation of an estimated state from a fluctuation waveform (fluctuation frequency and fluctuation magnitude) of time-series data of communication traffic, raises an abstraction level of the time-series data in such a manner that unnecessary fluctuation patterns are removed, and determines an application based on a resultant state sequence and application characteristics. FIG. 9 illustrates an example of a functional configuration (processing modules) of the traffic analysis apparatus 100. FIG. 9 is not a diagram that specifies a physical configuration of the traffic analysis apparatus 100. Regarding a physical configuration, a communication function may be added, and the individual functions (processing) may be realized by causing one or a plurality of processors connected to a memory to execute a group of commands.

<Communication Traffic Acquisition Part>

Referring to FIG. 8A, a communication traffic acquisition part 101 in FIG. 9 acquires analysis target communication traffic from the packet capture 10 in real time. As described above, the communication traffic acquisition part 101 may include a packet capture as illustrated in FIG. 8B or 8C.

<Communication Noise Calculation Part>

A communication noise calculation part 102 stochastically calculates a communication noise amount based on fluctuation of time-series data of communication traffic (for example, fluctuation frequency and fluctuation magnitude). Communication traffic is affected by, for example, fluctuation of wireless environment and change of transmission pattern from an application (such fluctuation and change will be referred to as "communication noise"), and as a result, the traffic pattern fluctuates.

Figure 10:
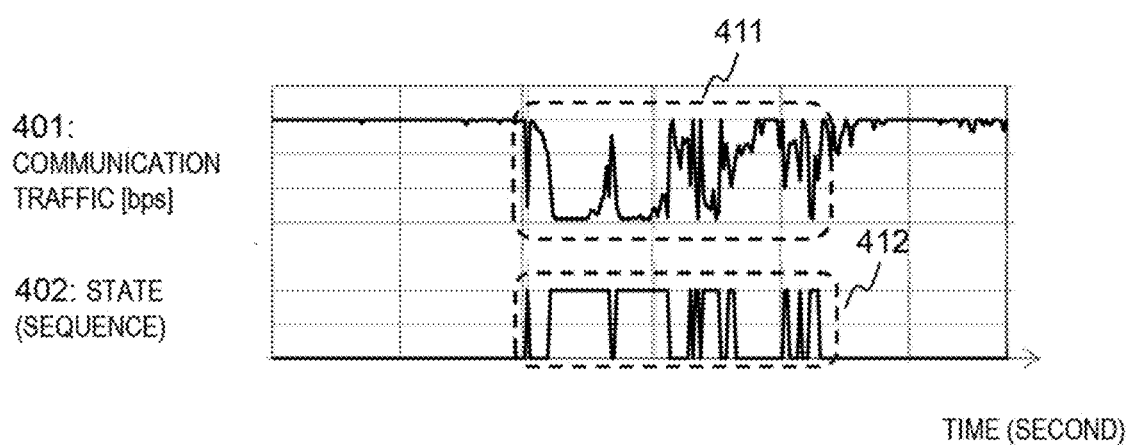
FIG. 10 is a diagram illustrating occurrence of an erroneous determination due to communication noise.

FIG. 10 illustrates, as time-series data 401 of communication traffic, the time-series data of communication traffic (throughput) obtained when real-time video is being delivered. 402 is designates a state sequence estimated by using a continuous HMM on the time-series data 401 of the communication traffic (throughput). In FIG. 10, in a time interval 411 of the state sequence, an application state is erroneously estimated due to fluctuation of communication traffic (throughput) caused by communication noise. Communication noise could rapidly change within a short time. On the other hand, there is an application whose traffic pattern does not change for a certain time. For example, in a case of moving image browsing, the traffic pattern such as communication traffic (throughput) does not change for a few tens of seconds to several minutes. According to the present invention, an erroneous determination incurred by communication noise may be suppressed by taking advantage of difference in granularity of fluctuation time.

Though not particularly limited thereto, in the present example embodiment, it is assumed that a relationship between a network environment type such as a fixed network (fixed line), a wireless network (for example, Wi-Fi (a registered trademark of Wi-Fi Alliance), etc.), or a mobile telephone network (for example, Evolved Universal Terrestrial Radio Access Network (E-UTRAN), and a core network such as Evolved Packet Core (EPC)) and a corresponding fluctuation waveform (fluctuation frequency and fluctuation magnitude) is in advance set in a storage apparatus or the like. For example, traffic having a certain transfer rate (for example, an application such as for video) may be caused to flow steadily in a network environment (a fixed network, a wireless network, or a mobile telephone network), and time-series waveform data of communication traffic (throughput) may be acquired to determine fluctuation frequency and fluctuation amplitude, in advance.

FIG. 11A illustrates a storage 1021 that holds fluctuation frequencies and fluctuation magnitudes of communication traffic (for example, throughput) in network environments (though not particularly limited thereto, environments includes a fixed network, a wireless network, and a mobile telephone network, for example). The storage 1021 may be included inside or outside the communication noise calculation part 102. Each of the individual fluctuation frequencies in the storage 1021 is the number of fluctuation occurrences per unit time.

For example, assuming that an instantaneous amplitude value (fluctuation magnitude) of fluctuation (communication noise) of communication traffic (throughput) follows stochastically a normal distribution, parameters representing characteristics of the fluctuation magnitude may be, for example, a fluctuation amplitude maximum value ($A_1$), an average ($\mu_1$), and a standard deviation ($\sigma_1$).

Regarding a network environment relating to analysis target traffic, the communication noise calculation part 102 may in advance acquire a noise characteristics parameter(s) of this network environment. For example, the network environment relating to the analysis target traffic may be acquired from the network node 20 in FIG. 8A or 8B. For example, when the network node 20 is a base station, the network environment is a wireless network. When the network node 20 is a core network node, the network environment is a mobile telephone network. When the network node 20 is an optical router or the like, the network environment is a fixed line (a fixed network).

The communication noise calculation part 102 may generate noise waveforms (time-series data) based on noise characteristics parameters. 405a, 405b, and 405c in FIG. 11C schematically illustrate generated noise waveforms (communication noise).

When an instantaneous amplitude value (fluctuation magnitude) follows a probability density function f(x) (x is an amplitude (stochastic variable)) such as a normal distribution, as illustrated in FIG. 11B, uniform random numbers in a range from 0 to an amplitude maximum value (for example, A1 in FIG. 11A) are generated (1022), and the generated uniform random numbers are inputted to an inverse function $F^{-1}$(x) 1023 of a cumulative distribution function F(x) of the probability density function f(x). As an output of the inverse function $F^{-1}$(x) 1023, a stochastic variable x (a random number) that follows the probability density function f(x) such as a normal distribution is generated (this method is also referred to as "an inverse function method"). Random numbers generated by the inverse function method may be arranged sequentially on a time axis to generate a noise waveform (time-series data) (in this case, the noise waveform fluctuates intensely on a time axis). Alternatively, the random numbers generated by the inverse function method may be sequentially sorted according to amplitudes thereof, for example, and the sorting result may be expanded and aligned on the time axis (1024). Consequently, as illustrated by 1025, a noise waveform having a certain width may be generated on the time axis.

The noise waveform 1025 on the time axis may be arranged to correspond to an occurrence positions of communication noise in the original communication traffic (throughput) 401 (FIG. 11C), for example. FIG. 11C schematically illustrates, as 405a, 405b, and 405c, noise waveforms that are arranged to correspond to occurrence positions of communication noise in the communication traffic (throughput) 401. Individual noise waveforms 405a, 405b, and 405c may be a noise waveform obtained by sequentially arranging random numbers generated by the inverse function method on the time axis. Alternatively, each of noise waveforms 405a, 405b, and 405c may be a composite waveform of a plurality of noise waveforms 1025 in FIG. 11B. Based on the fluctuation frequency information (the number of fluctuation occurrences per unit time), noise waveforms may be synthesized by separating the noise waveforms by time corresponding to 1/(fluctuation frequency).

The communication noise calculation part 102 may remove communication noise by subtracting from communication traffic (throughput) on a time axis, communication noise stochastically calculated. In FIG. 11C, 406 designates a time-series data waveform obtained by subtracting the communication noise 405a, 405b, and 405c from the time-series data of the original communication traffic (throughput) 401 on the time axis.

The communication noise calculation part 102 sets m column vectors of the time-series data of the communication noise generated (the noise waveform 1025 in FIG. 11B) to $\vec{g_1}, \ldots, \vec{g_m}$. The time-series data 401 from the communication traffic (throughput) may be represented by a vector $\vec{y}$ of n elements, namely, $\vec{y}=(y_1, y_2, \ldots y_n)^T$ (T is a transpose operator), and coefficient vectors $\vec{\beta}=(\beta_1, \beta_2, \ldots, \beta_m)$ and an offset vector $\vec{c}$ that minimize the square of an error $\varepsilon$ with respect to the generated m noise waveform vectors $\vec{g_1}, \ldots, \vec{g_m}$ may be calculated, for example (least-squares norm).

$$\varepsilon = |\vec{y} - (\beta_1 \cdot \vec{g_1} + \beta_2 \cdot \vec{g_2} + \ldots + \beta_m \cdot \vec{g_m} + \vec{c})| \qquad (33)$$

In this case, a constrained least-squares method having $\beta_1, \beta_2, \ldots, \beta_m \geq 0$ as a condition may be used. When vectors $\vec{g_i}$ and $\vec{g_j}$ of the time-series data of a plurality of (two) noise waveforms generated (j=i+1 when these vectors are adjacent to each other) overlap with each other on the time axis, for example, the larger values max($\vec{g_i}, \vec{g_j}$) or the smaller values min($\vec{g_i}, \vec{g_j}$) may be used as the corresponding time values. When three or more noise waveforms (time-series data) overlap with each other on the time axis, the same processing as described above may be performed.

By using the coefficients ($\beta_1, \beta_2, \ldots, \beta_m$) and the offset $\vec{c}$ that minimize the square of the error $\varepsilon$, the time-series data of the communication traffic (throughput) 406 in FIG. 11C (the time-series data from which the communication noise has been removed) may be obtained.

$$\vec{y} - (\beta_1 \cdot \vec{g_1} + \beta_2 \cdot \vec{g_2} + \ldots + \beta_m \cdot \vec{g_m} + \vec{c}) \qquad (34)$$

<Time-Series Data Normalization Part>

Figure 12:
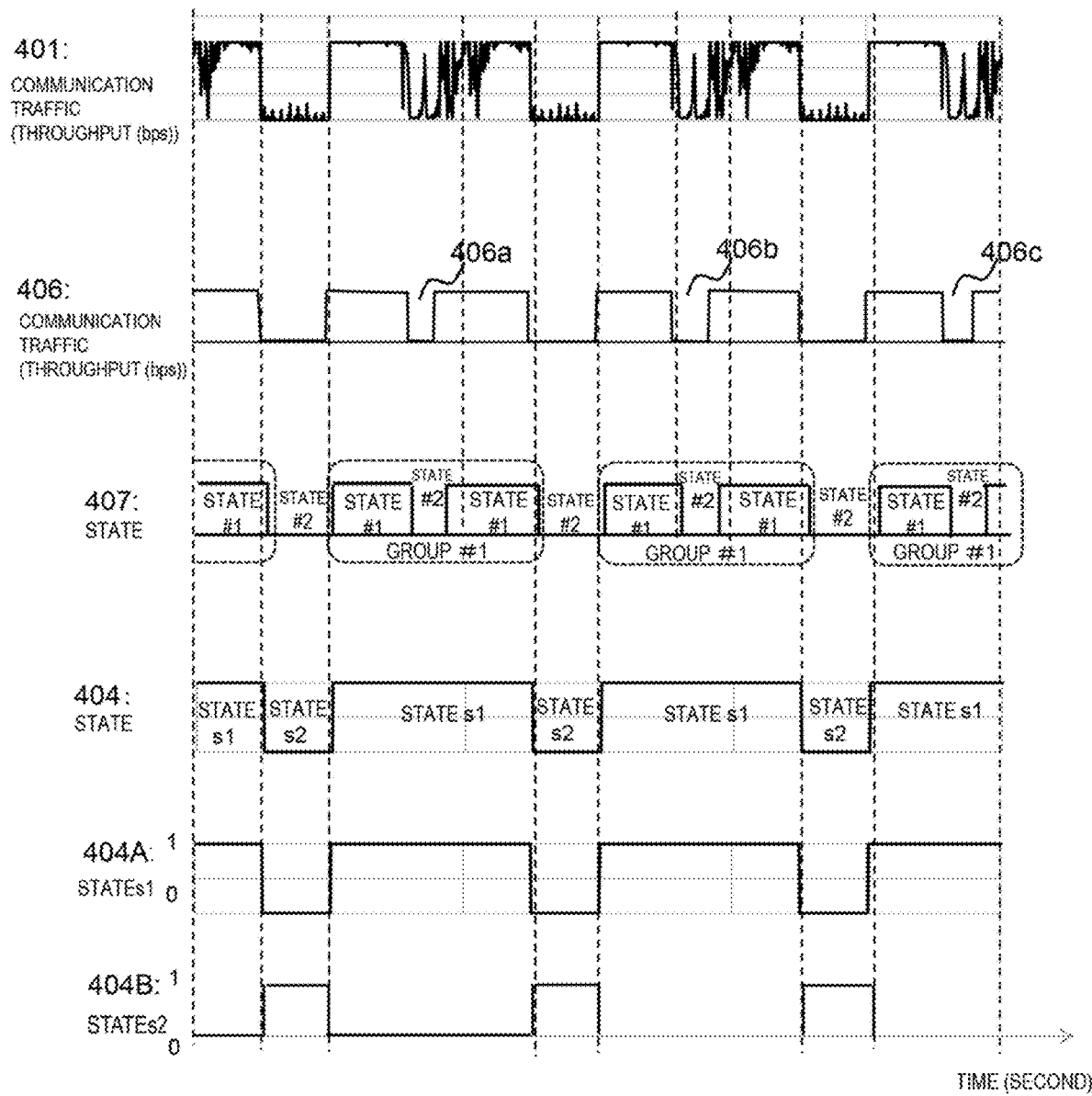
FIG. 12 is a diagram illustrating a time-series data normalization part according to the example embodiment 1 of the present invention.

Next, processing of a time-series data normalization part 103 in FIG. 9 will be described. FIG. 12 schematically illustrates an example of processing of the time-series data normalization part 103. 406 in FIG. 12 represents time-series data obtained after the communication noise calculation part 102 subtracts the communication noise (a waveform) from the time-series data 401 of the communication traffic (throughput) (corresponding to 406 in FIG. 11C).

The time-series data normalization part 103 estimates a state sequence 407 based on a continuous HMM, for example. In 407, the states corresponding to the application states A and B (see 201 in FIG. 2) estimated from the time-series data 406 from which the noise has been removed are represented as states #1 and #2, respectively.

The time-series data normalization part 103 applies an upper layer (a discrete HMM) of a hierarchical hidden Markov model to the state sequence 407, groups states (hidden states) of the continuous HMM in a time interval (s) having state transition patterns resembling each other, in the state sequence 407, and puts the grouped states into a single state (a hidden state) of the upper layer (discrete HMM).

In the example in FIG. 12, the time-series data normalization part 103 applies a discrete HMM to the state sequence 407 estimated by the continuous HMM and groups together, a state #1 and a state #2 in a state transition pattern (state #1→state #2→state #1) into a single group #1. In the time-series data normalization part 103, an individual state #2 in the state sequence 407 is a group #2. The state sequence 404 is extracted by regarding the group #1 as a state s1 of the discrete HMM, which is an upper layer, and the group #2 is regarded as a state s2 of the discrete HMM. The hidden state s1 corresponding to the group #1 outputs, for example, number 1 (corresponding to the state #1 in 407) and number 2 (corresponding to the state #2 in 407) in accordance with their respective predetermined output probabilities (for example, at every self-transition, number 1 or 2 is outputted in accordance with the corresponding output probability of the hidden state s1). Regarding the hidden state s2 corresponding to the group #2, for example, the output probability of number 1 (corresponding to the state #1 in 407) is 0.

The extracted state sequence 404 is the original state sequence reconstructed based on hidden states of the time-series data 401 of the communication traffic (throughput). While the values of the states s1 and s2 in the sequence state 404 are 1 and 0, respectively, other values may alternatively be used.

Figure 13:
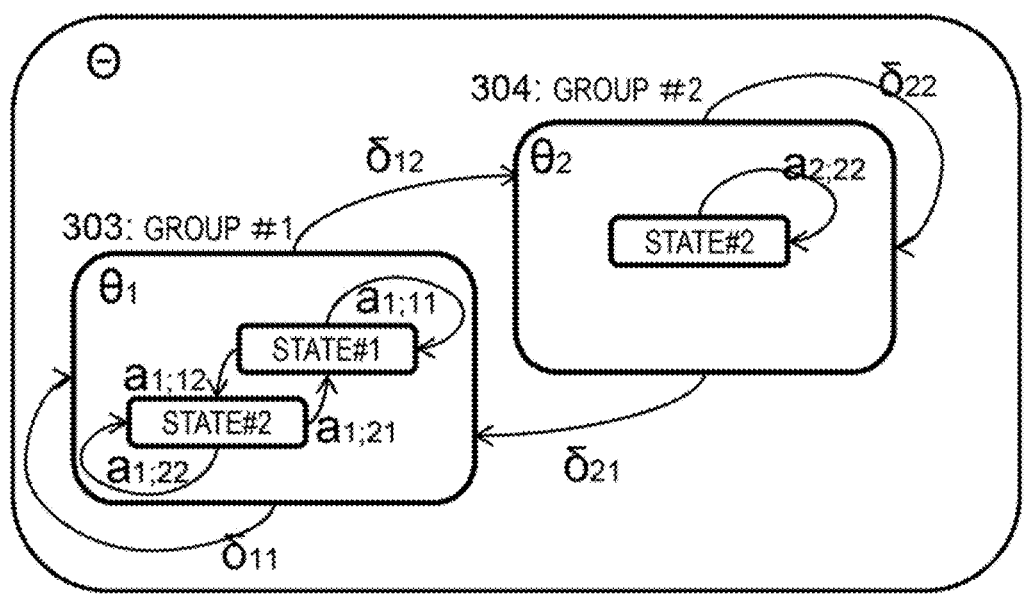
FIG. 13 is a diagram schematically illustrates a hierarchical model to which processing in FIG. 12 is applied in the time-series data normalization part.

FIG. 13 illustrates processing for detecting similar state transition patterns that is performed by the time-series data normalization part 103 in FIG. 9. 302 corresponds to 302 in FIG. 4B. Referring to FIG. 13, the group #1 includes the state #1 and the state #2, and a model $\theta_1$ includes an initial state probability, a state transition probability, an output probability (model parameters of a mixture Gaussian distribution). The group #2 includes the state #2, and a model $\theta_2$ includes an initial state probability, a state transition probability, and an output probability. The model $\theta$ of the upper layer HMM includes the models $\theta_1$ and $\theta_2$ and a transition probability $\Delta$ between the groups.

In FIG. 12, 404A is obtained by extracting temporal transition of the state s1 in the state sequence 404. The time intervals corresponding to the state s1 are represented by value 1, and the time intervals corresponding to the state s2 are represented by 0. 404B is obtained by extracting the temporal transition of the state s2 in the state sequence 404. The time intervals corresponding to the state s2 are represented by value 1, and the time intervals corresponding to the state s1 are represented by 0. It is fair to say that the sequence state 404A in FIG. 12 is a sequence obtained by reconstructing a sequence of the application state application state A in FIG. 1) that constitutes the communication traffic (throughput) 401.

As described above, the time-series data normalization part 103 applies a hierarchical HMM to the time-series data of the communication traffic (throughput) from which the communication noise has been removed by the communication noise extraction part 102 and estimates an optimum state sequence. The processing of the time-series data normalization part 103 corresponds to increasing the level of abstraction of the time-series data in such a manner that the fluctuation (noise) of the time-series data of the communication traffic (throughput) is removed. When a hierarchy number of the hierarchical HMM increases, a way of a state changes from "jiggly" to "rough" on a time axis.

The time-series data normalization part 103 may set, as a hierarchy number of the hierarchical model, a hierarchy number of the HMM model when fluctuation (communication noise: jiggly fluctuation, for example) of the communication traffic (throughput) has been removed.

In FIG. 12, communication traffic (throughput) 406 from which communication noise has been removed, may be referred to as normalized time-series data. In this case, based on a comparison between time intervals corresponding to a state s1 in the reconstructed state sequence 404 and time-series data of the communication traffic (throughput) 406, it is seen that in each time interval of 406a, 406b, and 406c, the communication traffic (throughput) corresponding to a state #1 is reduced due to communication noise, etc., as a result of which time intervals 406a, 406b, and 406c are estimated as a state #2 by the continuous HMM.

For example, the time-series data normalization part 103 may output a state sequence 404A (404B) in FIG. 12 as normalized time-series data.

Alternatively, the time-series data normalization part 103 may also output, as normalized time-series data, the time-series data of the communication traffic (throughput) 406 in FIG. 12.

<Application State Determination Part>

Next, an application state determination part 105 in FIG. 9 will be described. The application state determination part 105 calculates the similarity degree between a normalized state sequence and application characteristics (for example, fluctuation characteristics of communication traffic) registered in a storage 106 in advance to determine to which application state a state a relevant time interval corresponds.

Figure 14:
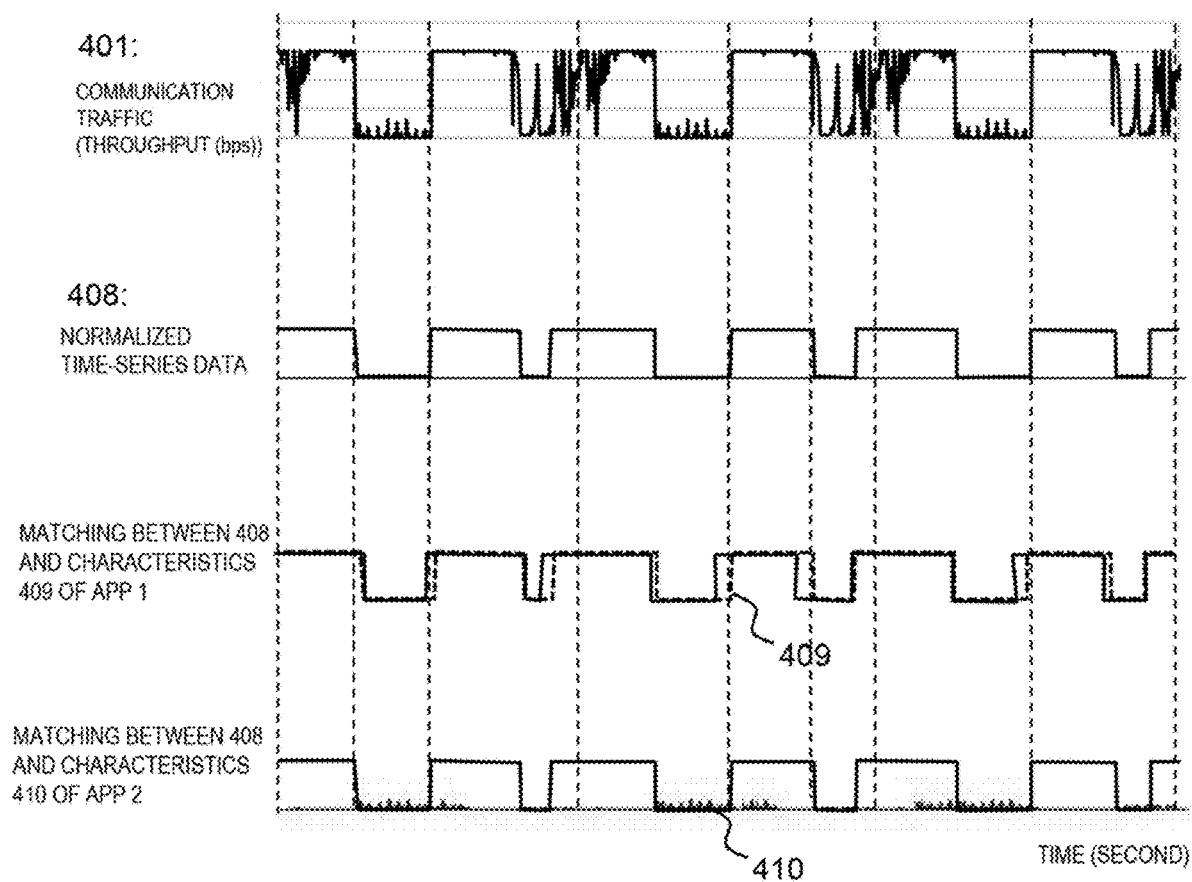
FIG. 14 is a diagram illustrating processing of an application state determination part according to the example embodiment 1 of the present invention.
Figure 15:
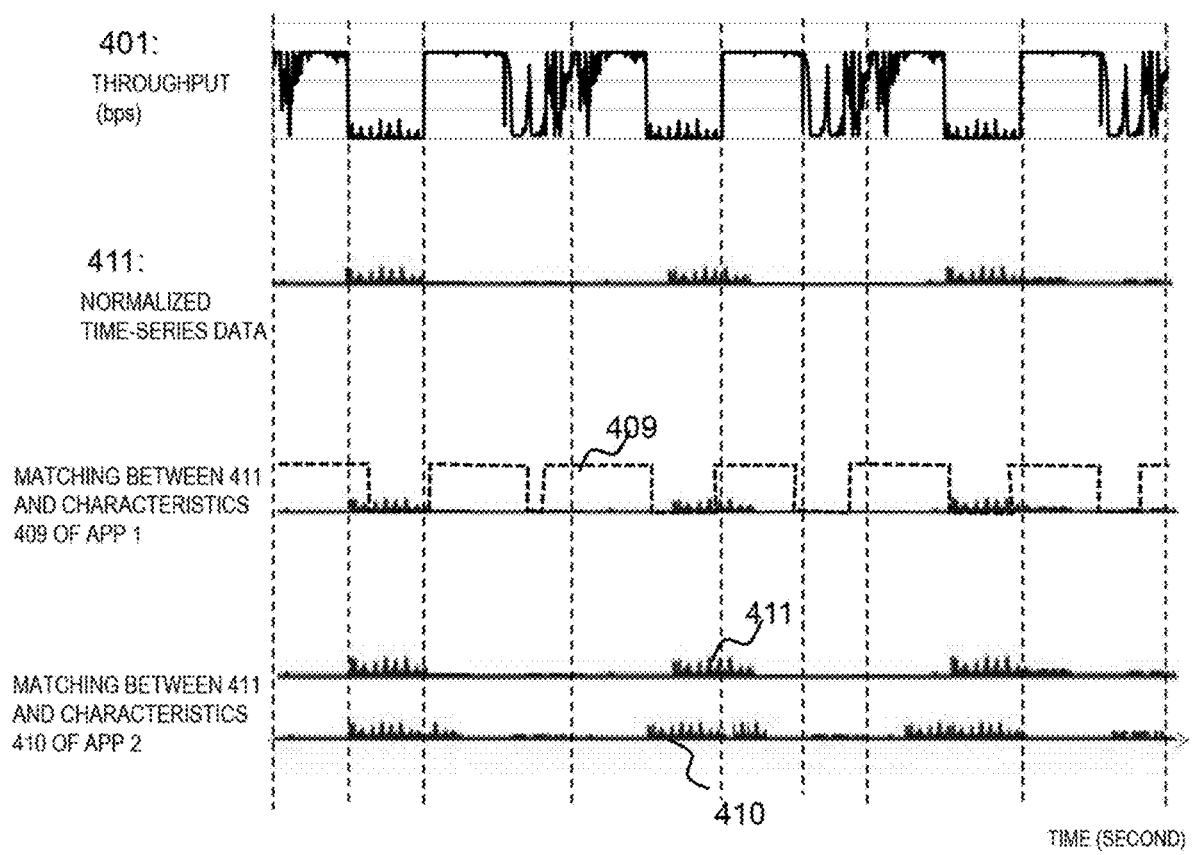
FIG. 15 is a diagram illustrating processing of the application state determination part according to the example embodiment 1 of the present invention.

FIGS. 14 and 15 are diagrams illustrating the application state determination part 105 in FIG. 9. Referring to FIG. 14, the application state determination part 105 calculates a similarity degree between time-series data (an application state A) 408 normalized by the time-series data normalization part 103 and characteristics (a dashed line 409 in FIG. 14) of application 1 stored in the storage 106 in advance.

A cross-correlation function may be used for a similarity degree between the two waveforms (time-series data). The time-series data (the application state A) 408 normalized by the time-series data normalization part 103 may be waveform data obtained by gating the time-series data obtained by removing communication noise from the communication traffic (throughput) 401 with the time intervals corresponding to value 1 of the sequence (404A in FIG. 12) of the state #1 (application state A) extracted by the time-series data normalization part 103.

In the example in FIG. 14, a correlation value (a cross-correlation value) between the normalized time-series data 408 and the communication traffic (throughput) characteristics 409 of the application 1 is 0.9, and a cross-correlation value between the normalized time-series data 408 and communication traffic (throughput) characteristics 410 of an application 2 is 0.1. Thus, the application state determination part 105 determines that the normalized time-series data 408 corresponds to the communication traffic (throughput) characteristics of the application 1 (application state A).

The application state determination part 105 may obtain a degree of similarity (for example, a cross-correlation value) by matching a pattern of a state sequence (for example, 404A in FIG. 12) outputted by the time-series data normalization part 103 against patterns of the state sequences of the applications 1 and 2 to determine to which application state the pattern of a state sequence corresponds.

Referring to FIG. 15, the application state determination part 105 calculates a cross-correlation value (0.01) between the characteristics (dashed line 409 in FIG. 15) of the application 1 stored in the storage 106 in advance and the time-series data (application state B) 411 normalized by the time-series data normalization part 103 and a cross-correlation value (0.8) between the characteristics (410 in FIG. 15) of the application 2 and the time-series data (application state B) 411. In FIG. 15, since it is difficult to distinguish the normalized time-series data 411 from the characteristics 410 of the application 2 if waveforms are illustrated using the same lines and overlapped, the normalized time-series data 411 and the characteristics 410 of the application 2 are separately illustrated by using the same time axis. The time-series data (the application state B) 411 normalized by the time-series data normalization part 103 may be waveform data obtained by gating the time-series data obtained by removing communication noise from the communication traffic (throughput) 401 with the time intervals corresponding to value 1 of the sequence (404B in FIG. 12) of the state #2 (the application state B) extracted by the time-series data normalization part 103.

The application state determination part 105 determines that the normalized time-series data 411 is the waveform of the communication traffic (throughput) of the application 2. In FIG. 15, the normalized time-series data 411 is the time-series data of throughput in the telephone call state, and a vertical axis (bps) has the same scale as that of the normalized time-series data (the application state A) 408 (FIG. 14). Thus, the data is illustrated as a minute amplitude waveform. However, for example, by setting the maximum value of 411 to the full scale or the like, the communication noise, etc. can be removed from the throughput by the above noise removal method.

Instead of comparing the characteristics waveforms of the applications 1 and 2 with the state sequence 404 (the normalized time-series data) corresponding to all the time intervals of the communication traffic (throughput) acquired by the communication traffic acquisition part 101 and calculating correlation values (cross-correlation values), the application state determination part 105 may divide the state sequence into blocks (time intervals) (for example, every 200 seconds in FIG. 9) and calculate, on a per block basis, a degree of similarity (a cross-correlation value) between the time-series data normalized by the time-series data normalization part 103 and the characteristics of the applications 1 and 2 in the corresponding block (time interval). For example, in FIGS. 14 and 15, for each time interval having a predetermined length, the application state determination part 105 may calculate a total (sum) of similarity degrees of individual blocks as a similarity degree between the normalized time-series data and the characteristics (communication traffic characteristics) of the applications 1 and 2.

The application state determination part 105 may calculate the similarity degree between the normalized time-series data and the communication traffic characteristics (time-series data) of an application stored in the storage 106 in advance, by using a cosine distance, a Euclidean distance, or the like.

In addition, the application state determination part 105 may determine a state of an application based on a similarity degree between a state sequence extracted by the time-series data normalization part 103 and a state sequence pattern of an application. In this case, assuming that 1 is set when a state in a certain time interval is the relevant application state and that 0 is set when the state is not the relevant application state (for example, 404A in FIG. 12), the state sequence is represented by binary time-series data (state vectors). Thus, the application state determination part 105 may calculate a similarity degree between a state vector and a state vector of an application stored in the storage 106 in advance by using a Hamming distance or the like. In this case, when the Hamming distance is equal to or less than a predetermined value, the state vectors are determined to be similar to each other.

<Application State Determination Part: Variation 1>

Alternatively, the application state determination part 105 may analyze time-series data of communication traffic (throughput), extract a feature(s) value such as communication cycle, communication period, non-communication period, and maximum throughput, to compare the extracted feature value(s) with application characteristics (communication cycle, communication period, non-communication period, maximum throughput, etc.) stored in the storage 106. In this case, the application state determination part 105 may determine the application state based on a comparison result. Alternatively, the application state determination part 105 may analyze time-series data of communication traffic (throughput) and compare the time-series data with applications with regard to packet size (for example, an average value), packet transmission interval (arrival interval) (for example, an average value), and packet frequency (for example, an average value), for example.

Figures 16A, 16B:
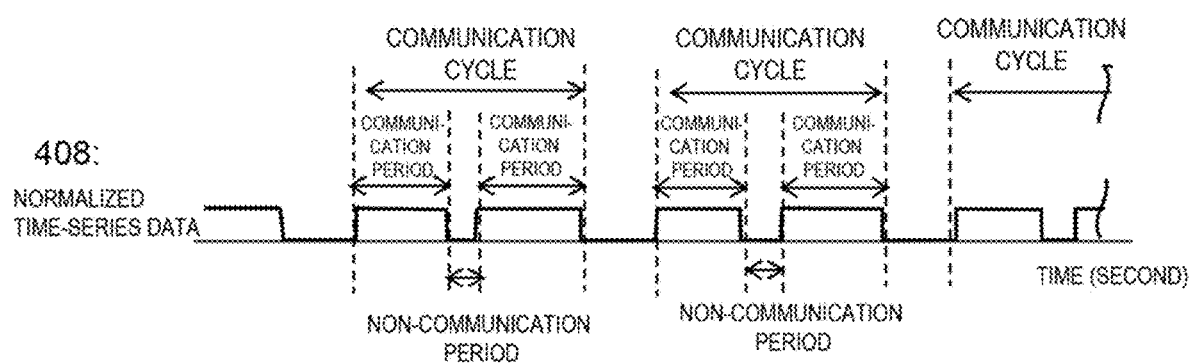
FIGS. 16A and 16B are diagrams illustrating variation 1 of the application state determination part according to the example embodiment 1 of the present invention.

For example, as illustrated in FIG. 16B, the communication feature values (communication cycle: 300 s (second), communication period: 270 s, non-communication period: 30 s, maximum bps: 5 mega bps (communication cycle, communication period, and non-communication period are illustrated in FIG. 16A)) of the normalized time-series data 408 are collated with characteristics (communication feature values) of the applications 1 and 2 stored in the storage 106 (see 412 in FIG. 16B), and the application state 1 may be determined through categorization. The application state may be determined by comparison with characteristics (communication cycle, communication period, non-communication period, maximum throughput, etc.) of an application stored in the storage 106. Alternatively, the application state determination part 105 may analyze time-series data of communication traffic (throughput) and compare the analysis results with applications with regard to packet size (for example, an average value), packet transmission interval (arrival interval) (for example, an average value), packet frequency (for example, an average value), etc.

<Application State Determination Part: Variation 2>

Figure 17A:
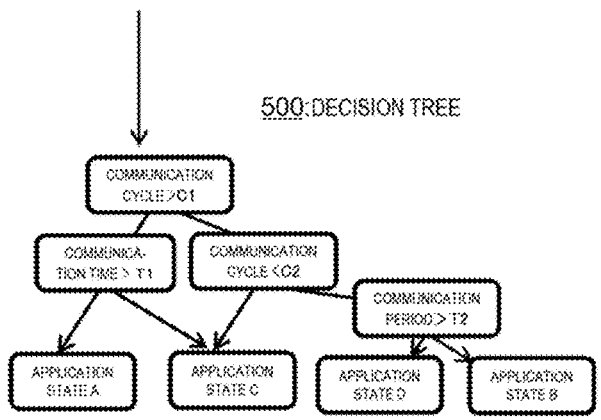
FIGS. 17A and 17B are diagrams illustrating variation 2 of the application state determination part according to the example embodiment 1 of the present invention.

Alternatively, the application state determination part 105 may analyze time-series data of communication traffic of an application state as training data, extract a feature value(s) (attribute value(s)) such as communication cycle, communication period, non-communication period, and maximum throughput, and generate a classifier (classification model)

that determine the application state through machine learning based on correct labels (application states) and data (for example, at least one of an average value, variance, maximum value, minimum value, etc. of a feature value(s) of the communication traffic). When performing evaluation, the application state determination part 105 may determine an application state by using a learned classifier (classification model) on the feature value(s) extracted from an evaluation target communication traffic. Though not particularly limited thereto, as illustrated in FIG. 17A, the application state determination part 105 may use a decision tree 500 (classifier having a tree structure) as a classifier of supervised learning.

Figure 17B:
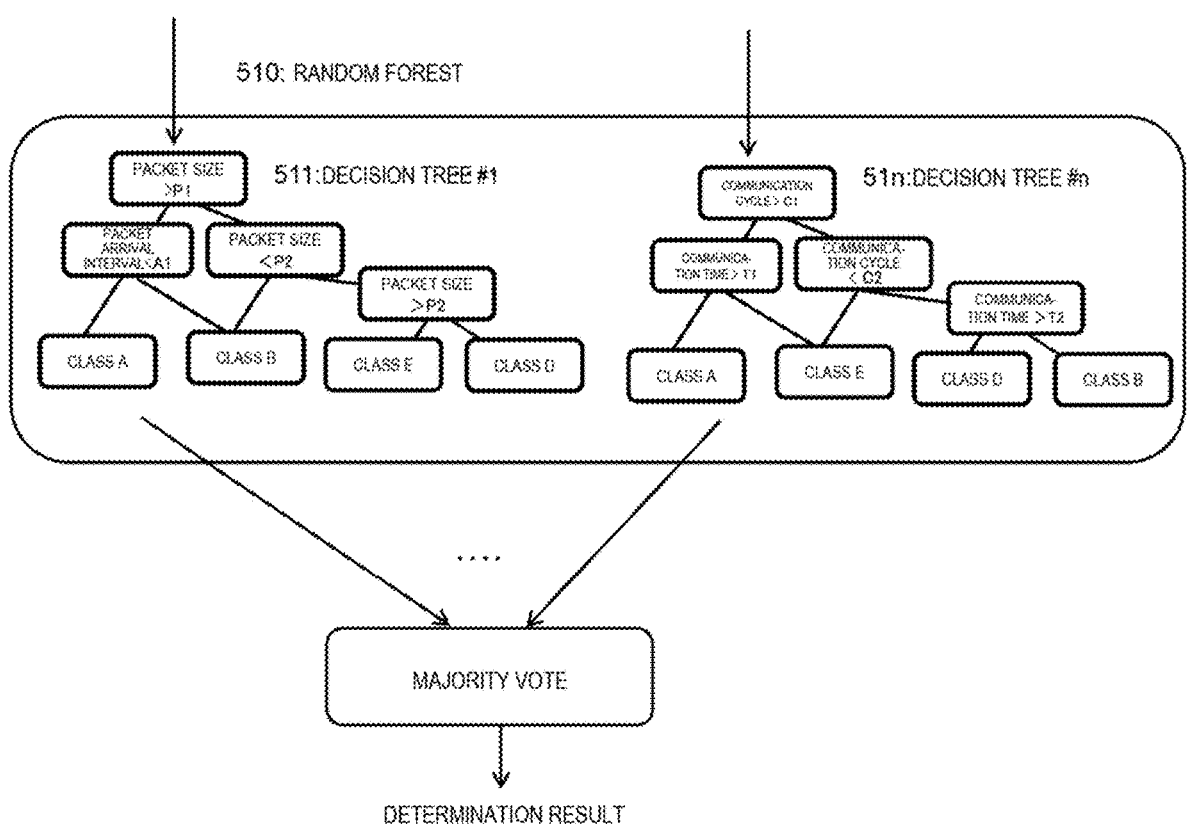

Alternatively, as illustrated in FIG. 17B, the application state determination part 105 may create a plurality of decision trees and use a random forest 510 that makes a determination by a majority vote. When performing learning, for example, the application state determination part 105
randomly generates a plurality of sets of subsamples from sample data,
creates a plurality of sets of decision trees by using the sub samples as training data,
randomly selects a predetermined number of attributes (explanatory variables) of the training data (for example, the communication cycle, the communication interval, the packet size, etc. in FIG. 17B), determines branch conditions of the individual nodes of decision trees 511 to 51n by using classification results and attribute thresholds of the training data, and generates a model.

When performing evaluation, the application state determination part 105 may enter the feature values extracted from the communication traffic to the random forest 510 and take a majority vote of outputs (classes of leaf nodes) of the decision trees. FIG. 17B illustrates schematic examples of explanatory variables (attributes) in the individual nodes of the decision trees 511 to 51n. The individual explanatory variables may be at least one of an average value, variance, maximum value, minimum value, etc., of feature values of the communication traffic.

Classes A, B, etc. of leaf nodes in the decision trees 511 to 51n of the random forest 510 in FIG. 17B may be application states (an application state A and an application state B, which are application types, for example).

Alternatively, the classes A, B, etc. of the leaf nodes in the decision trees 511 to 51n of the random forest 510 in FIG. 17B may be operation modes, etc. of an application state (operation modes, communication modes, etc. of the same application). The application state determination part 105 may supplies time-series data of communication traffic (throughput) as input to a classifier such as the decision tree 500 or the random forest 510 and determine an operation mode in the same application state (application type). For example, the application state determination part 105 may identify an operation mode out of a plurality of operation modes of an application (for example, a drone application) having the same throughput of an analysis target communication traffic.

The classifier used by the application state determination part 105 is not limited to a decision tree, a random forest, etc. The application state determination part 105 may use a support vector machine, a Bayes estimator (Naive Bayes classifier), a neural network, or the like.

Figure 18:
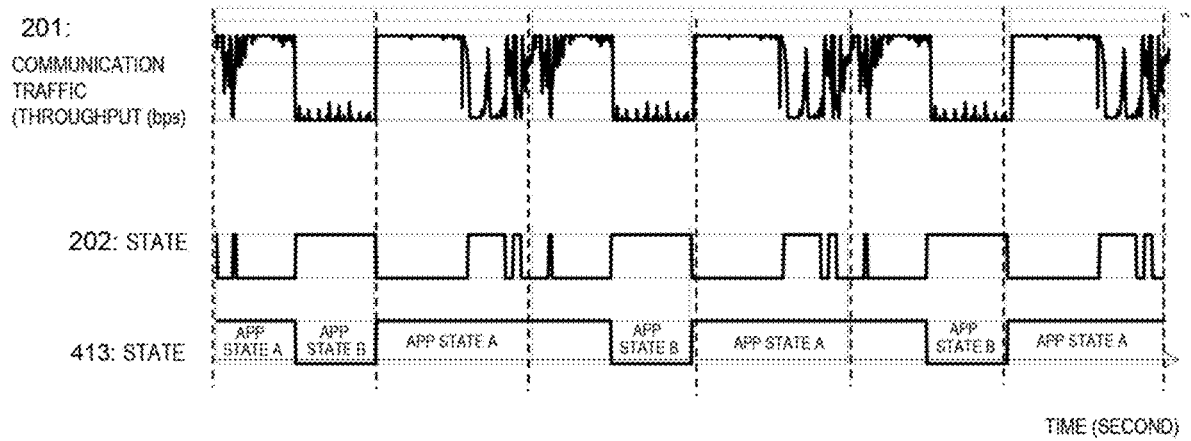
FIG. 18 is a diagram illustrating an operational advantage according to the example embodiment 1 of the present invention in comparison to a prototype (a comparative example).

FIG. 18 illustrates an operational advantage according to example embodiment 1. In FIGS. 18, 201 and 202 designate the communication traffic (throughput) in FIG. 1 and an estimated state sequence (a prototype). 413 designates a state sequence estimated from the communication traffic (throughput) according to example embodiment 1.

As is clear from FIG. accuracy of an application state estimated according to example embodiment 1 is higher than that of the prototype. In this way, according to example embodiment 1, an application state can be accurately estimated from a feature value (throughput) of communication traffic having intense fluctuation. According to example embodiment 1, it is possible to estimate transition of an application state based on communication traffic pattern such as source and destination addresses (ports), throughput, etc. among the five tuples of a communication traffic packet while avoiding an impact of fluctuation (communication noise), etc. of communication traffic (throughput, etc.) pattern. In this way, an estimation accuracy can be improved. As described above, according to example embodiment 1, time-series data of an evaluation target (analysis target) communication traffic is not limited to throughput. Time-series data may be packet size, packet transmission interval, packet frequency (for example, at least one of an average value, variance, maximum value, minimum value, etc.), etc. The application (type, state, operation mode, etc.) may be determined from time-series data of a plurality of attributes with a time axis in common. Namely, while an application state A (video delivery) and an application state B (voice telephone call) correspond to application types, the application state may correspond to communication modes or operation modes (for example, transfer modes of control plane data and user plane data, namely, control operation and data transfer operation between nodes, etc.) of the same application.

Example Embodiment 2

Figure 19:
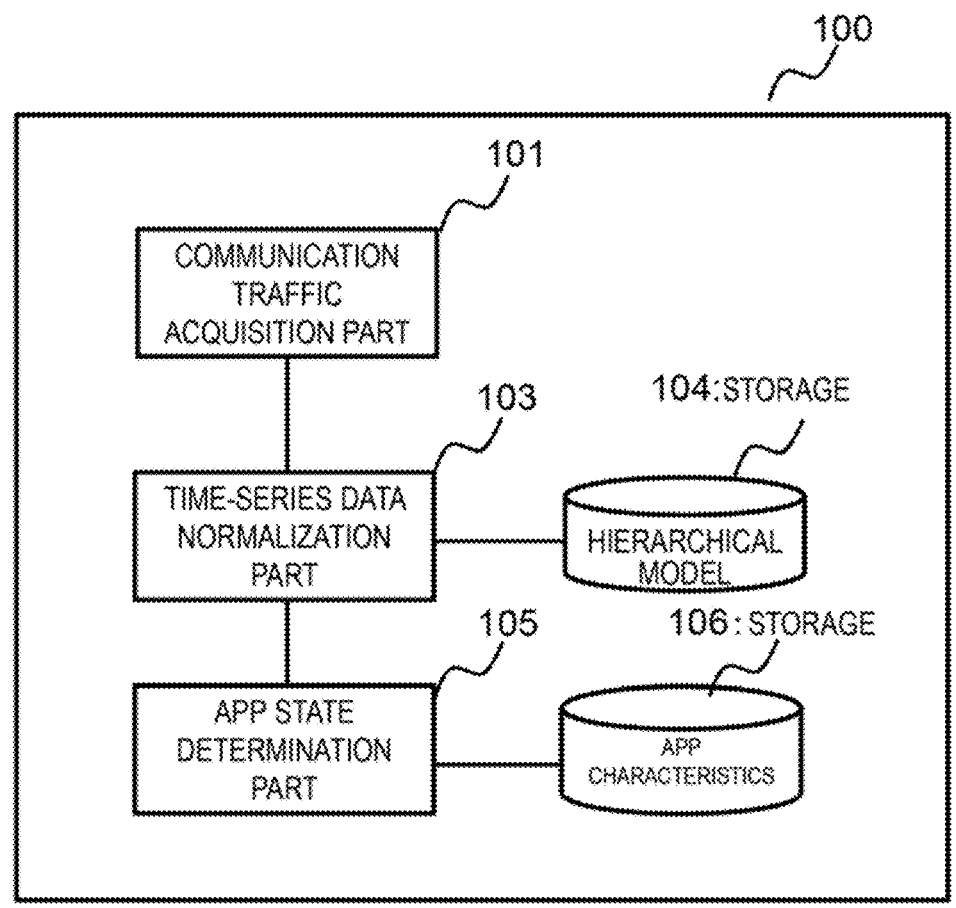
FIG. 19 is a diagram illustrating a configuration example of a traffic analysis apparatus according to an example embodiment 2 of the present invention.

FIG. 19 illustrates an example embodiment 2. In the example embodiment 1, when acquiring time-series data obtained by removing communication noise from time-series data of communication traffic (throughput), a noise waveform is subtracted from the time-series data of the communication traffic (throughput). In the example embodiment 2, the time-series data normalization part 103 is used as means for removing communication noise from time-series data of communication traffic (throughput). In this case, the communication noise calculation part 102 according to the example embodiment 1 in FIG. 9 may be removed (alternatively, the communication noise calculation part 102 may be included as in FIG. 9).

In order to detect patters which have state transition patterns resembling each other from a state sequence estimated by a continuous HMM, the time-series data normalization part 103 uses a discrete HMM that functions as an upper hierarchical layer of the continuous HMM. The time-series data normalization part 103 groups resembling state transition patterns into a single group (a single state of the upper layer).

Figure 20:
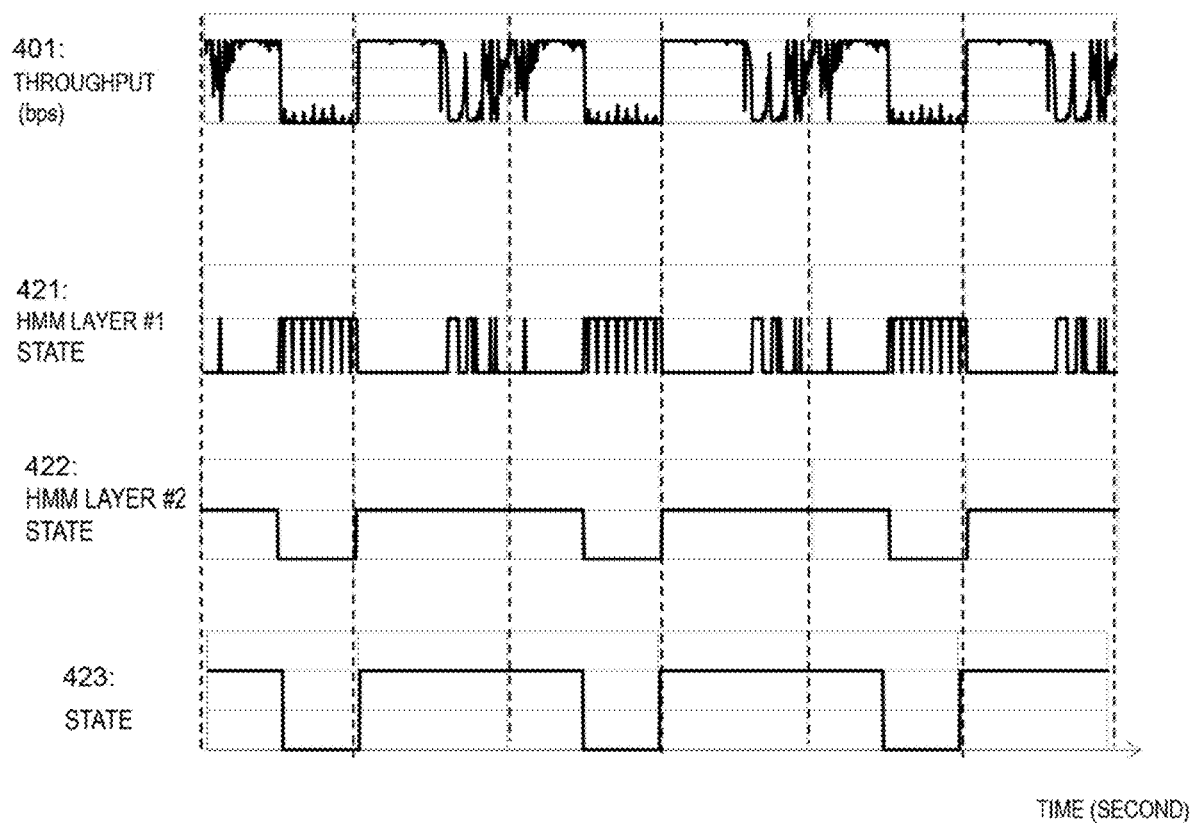
FIG. 20 is a diagram illustrating the example embodiment 2 of the present invention.

FIG. 20 illustrates an operation in which the processing of the time-series data normalization part 103 in FIG. 19 is performed by the time-series data normalization part 103. In FIG. 20, the time-series data of communication traffic (throughput) 401 is the same as that of the communication traffic 401 in FIG. 6. 421 designates a state sequence estimated by a continuous HMM (HMM layer #1). Namely, 421 is a state sequence outputted from the time-series data normalization part 103, which receives the time-series data of the communication traffic (throughput) 401. The state sequence 421 estimated by the continuous HMM also changes (fluctuates) intensely in response to fluctuation (fluctuation frequency and fluctuation magnitude) of the time-series data of the communication traffic (throughput) 401.

By using the discrete HMM (HMM layer #2) on a state sequence estimated by the continuous HMM, the time-series data normalization part 103 detects patterns which have transition patterns between or among states resembling each other, puts together the patterns into a single group (a single state of the upper layer), and outputs the state sequence in the upper layer. Thus, the state sequence patterns that intensely transition with a high frequency and a high amplitude can be grouped into a single state, for example. 422 designates a state sequence obtained by grouping resembling patterns into a single state by using the discrete HMM on the state sequence 421. It is seen that the state sequence 422 matches the state sequence 203 in FIG. 1. The hierarchy number of the hierarchical HMM is not of course limited to 2. For example, when a hierarchical model is learned by using sample traffic and an EM algorithm, etc., the hierarchy number that has succeeded in removing jiggly fluctuations (communication noise) of the throughput may be set as the hierarchy number of the hierarchical model.

A hierarchical model used by the time-series data normalization part 103 (for example, models of the continuous HMM and the discrete HMM in the upper layer) is stored in a storage 104. The storage 104 may be a RAM, an HDD, or the like. Regarding the hierarchical model, sample traffic may be caused to flow, time-series of an obtained throughput may be analyzed by a hierarchical model, and model parameters may be configured. When communication noise can be removed with a specific hierarchical model, the hierarchy number may be set as a hierarchy number of the specific hierarchical model.

Example Embodiment 3

Next, an example embodiment 3 of the present invention will be described. As with the example embodiment 2 and FIG. 15, a traffic analysis apparatus 100 according to the example embodiment 3 may be configured without communication noise calculation part 102 in FIG. 7 (however, the communication noise calculation part 102 may be included as in the example embodiment 1 in FIG. 9).

Unlike the example embodiment 2, according to example embodiment 3, as communication noise removal means, the time-series data normalization part 103 uses, as an HMM state, an HMM in which a state duration time is taken into account. The characteristics of an application state differ from those of communication noise in that video or the like from a camera, which is an IoT (Internet of Things) device, remains in the same state (traffic characteristics, throughput) for a long time. When a coding rate of an encoder that performs compression coding on images acquired from a camera is kept at a constant level for a preset time, a throughput of communication traffic from the camera is kept constant. However, communication noise occurs instantaneously.

Figure 21:
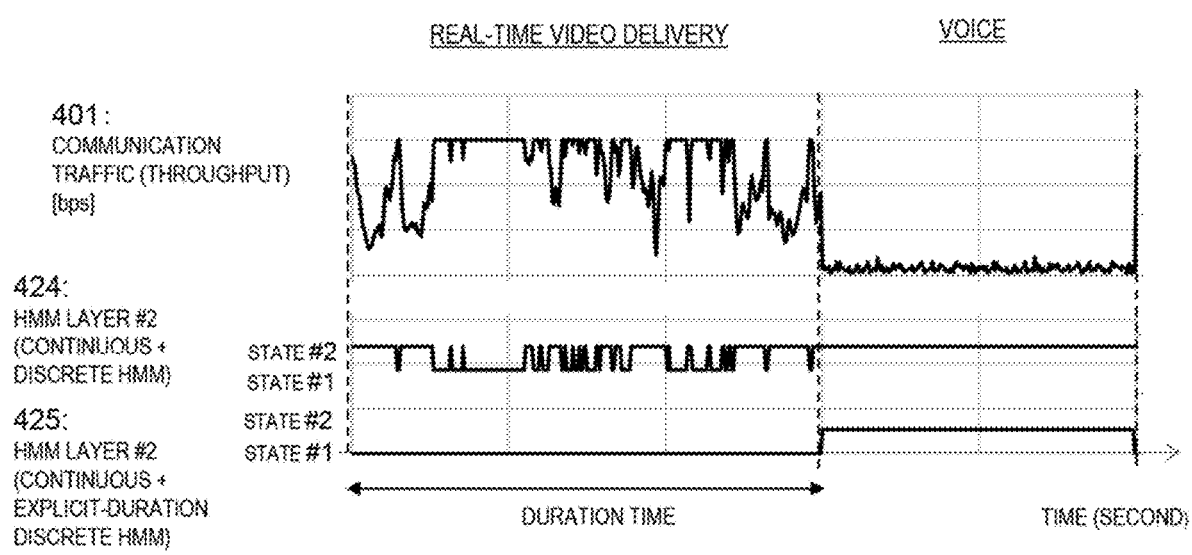
FIG. 21 is a diagram illustrating an example embodiment 3 of the present invention.

The time-series data normalization part 103 according to the example embodiment 3 may use an HMM (Explicit-Duration HMM: EDHMM) that takes into account a state duration time distribution, in which it is assumed that a state does not change for a certain time, and remove communication noise that occurs instantaneously as illustrated in FIG. 21, for example. In this case, a hidden state $z_t$ is given by a state $s_t$ and a duration time $rt_t$.

$$z_t = \{s_t, r_t\}$$

As model parameters (model parameters of a continuous mixture HMM) assuming a case in which an input value does not change for a certain time, in addition to $$\theta = \{(\pi_i, a_{ij}, c_{jk}, \theta_{jk}), j=1, \ldots, N, l32\ 1, \ldots, K\}$$

a parameter $\lambda i$ of a duration time distribution $F_r$ specific to a state i is added.

It is assumed that a state sequence: $s=(s_1, \ldots, s_T)$ and a remaining duration time sequence: $r=(r_1, \ldots, r_T)$.

In EDHMM, if $r_t$ is not 0, a current remaining duration time is decremented by 1, and the state remains at $s_t$.

If $r_t=0$, the state $s_t$ transitions to state $s_m$ (m≠t).

According to the example embodiment 3, in FIG. 21, a continuous HMM and an EDHMM (Explicit-Duration) type discrete HMM are used as a hierarchical model. For example, after transition to a state #1 (application: real-time video delivery), the state will not be affected by fluctuation (communication noise) of communication traffic (throughput) that occurs until the remaining duration time reaches 0. Namely, this state continues until the remaining duration time reaches 0 (see duration time r (Duration-Time) in FIG. 21). Thus, the time-series data normalization part 103 outputs a state sequence 425 which is not affected by communication noise, unlike a state sequence 424 in FIG. 21 which is affected by communication noise.

In the example in FIG. 21, since the application state (real-time video delivery) is assumed to continue for a certain time, in the state sequence: $s=(s_1, \ldots, s_T)$, the duration time r (model parameter) of the application state (video) (state #1 of 425) is kept constant.

For example, when the duration time r of the state 1 differs depending on the operation mode of the application (for example, the same real-time video delivery), the time-series data normalization part 103 may, as a matter of course, estimate the duration time r based on an HMM model, by taking into account that the state is affected by the fluctuation (communication noise) of communication traffic (throughput). The continuous HMM may, as a matter of course, be constituted by using an EDHMM.

According to the example embodiment 3, for example, while a duration time model parameter needs to be set additionally, the same operational advantage as that according to the example embodiment 1 is provided.

Example Embodiment 4

Figure 22:
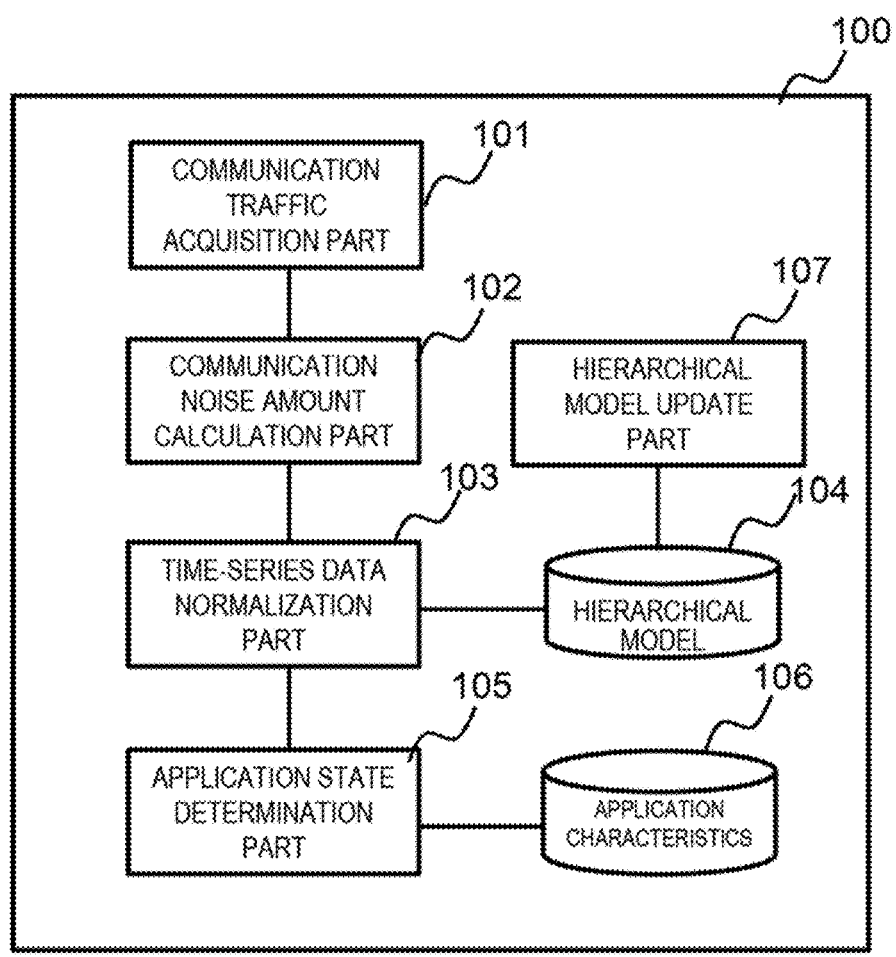
FIG. 22 is a diagram illustrating a configuration example of a traffic analysis apparatus according to an example embodiment 4 of the present invention.

FIG. 22 illustrates an example of a configuration of a traffic analysis apparatus 100 according to an example embodiment 4 of the present invention. Referring to FIG. 22, in addition to the configuration of the traffic analysis apparatus 100 according to the example embodiment 1 in FIG. 9, a hierarchical model update part 107 that updates a hierarchical model in a storage 104 is provided. The hierarchical model update part 107 updates a hierarchical model for tracking change of characteristics of an application state which is a traffic source.

Figure 23A:
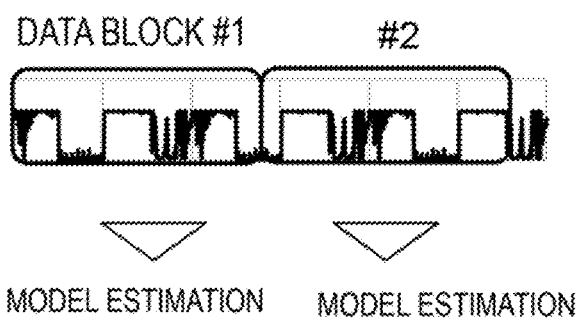
FIGS. 23A and 23B are diagrams illustrating the example embodiment 4 of the present invention.

Examples of the hierarchical model update method may be classified into batch processing and online processing. In the batch processing, as schematically illustrated in FIG. 23A, latest throughput data is analyzed on a per appropriate data block length basis (length of input data), and the hierarchical model is updated based on an analysis result. Estimation of the hierarchical HMM model is the same as that according to the above example embodiment 1. A fixed or variable data block length may be used.

If the hierarchical model update part 107 uses a variable data block length, for example, when the number of states in a data block is 1 (when the same state continues for a long time), the data block length may be extended.

When the number of states is more than one, the data block length may be shortened.

The model parameters updated by the hierarchical model update part 107 include at least one of the above model parameters of the continuous mixture HMM, $$\theta=\{(\pi_i,a_{ij},c_{jk},\theta_{jk});i,j=1,\ldots,N,l=1,\ldots,K\}$$

the models θ1 and θ2 of the respective groups of the upper layer HMM models, and the transition probability Δ between groups.

Figure 23B:
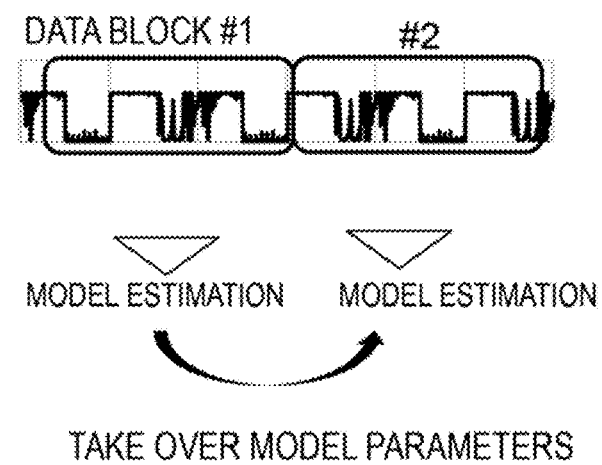

In the online processing, as illustrated in FIG. 23B, a hierarchical model may be estimated from model parameters analyzed in the past and newly obtained data blocks. Computational complexity may be reduced by performing the model estimation in an incremental manner. In this way, a timing budget critically needed in the online processing can be satisfied. The model estimation is the same as that according to the example embodiment 1.

According to the example embodiment 4, since the hierarchical model can be updated based on change of characteristics of the application state, the change of the characteristics of the application state can be tracked, and an estimation accuracy of the application state from communication traffic can be improved further.

Example Embodiment 5

Figure 24:
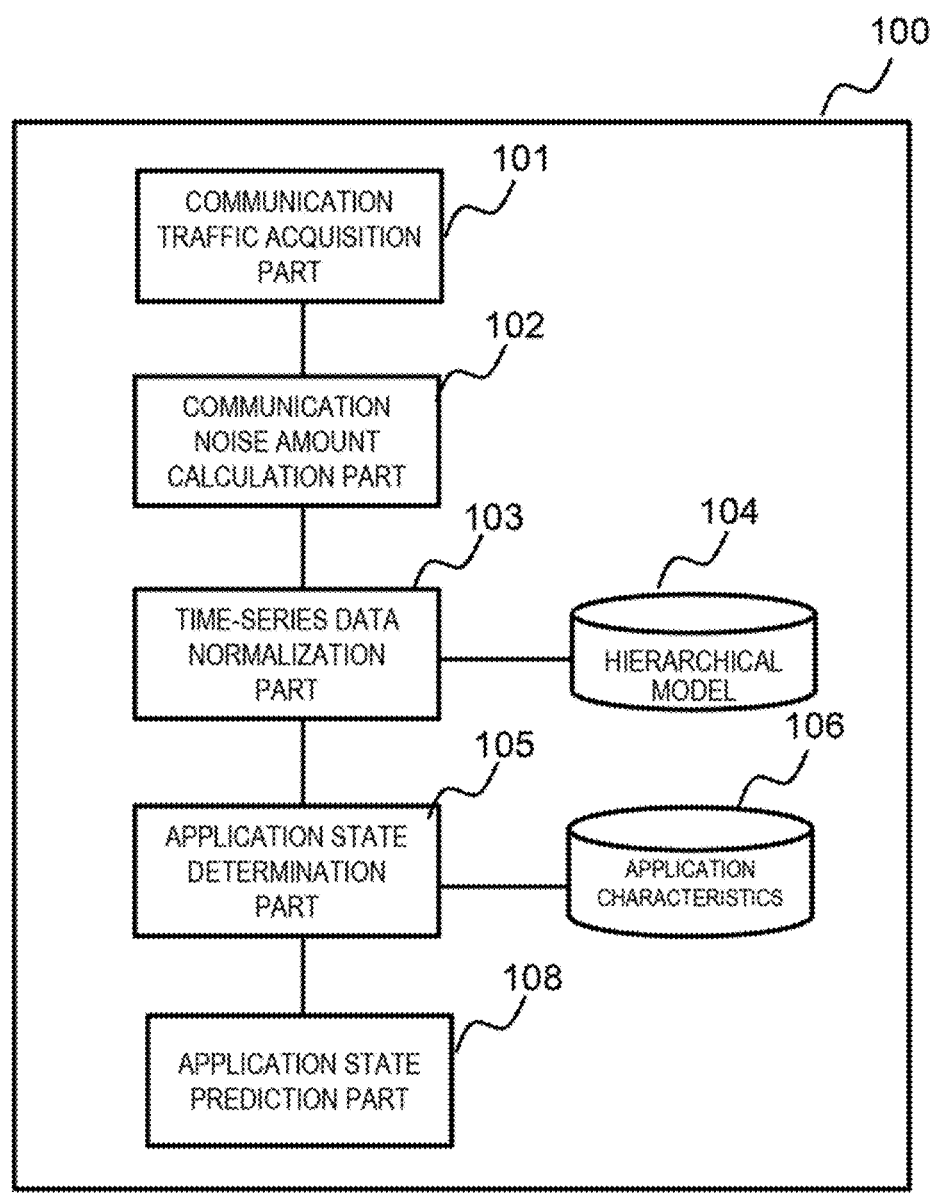
FIG. 24 is a diagram illustrating a configuration example of a traffic analysis apparatus according to an example embodiment 5 of the present invention.
Figure 25:
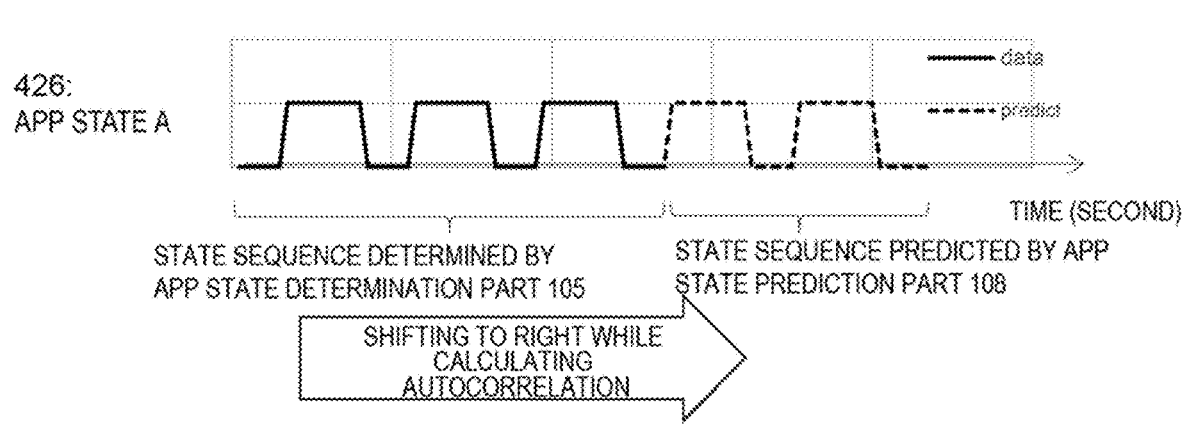
FIG. 25 is a diagram illustrating the example embodiment 5 of the present invention.

FIG. 24 illustrates an example embodiment 5 of the present invention. Referring to FIG. 24, in the example embodiment 5, an application state prediction part 108 is further provided. The application state prediction part 108 predicts a future application state transition pattern by using an application state determined by the application state determination part 105. As the prediction method used by the application state prediction part 108, as schematically illustrated as an example in FIG. 25, point prediction or segment prediction may be used. For example, autocorrelation may be calculated on an estimated application state sequence, and a state sequence that occurs in the future may be predicted. The dashed line in FIG. 25 is a future sequence of an application state A.

Alternatively, the application state prediction part 108 may perform stochastic prediction 1 (simulation). By using parameters estimated by using an HMM, future prediction is performed in accordance with a Markov Chain Monte Carlo (MCMC), for example. In the MCMC, a new sample is acquired based on a sample acquired immediately therebefore. There are a Metropolis-Hastings (MH) algorithm, Gibbs sampling, etc. Among these techniques, in the MH algorithm, a value used as the next candidate is generated from a probability distribution referred to as a proposed distribution q(y|x), and whether to adopt or reject the value is determined based on a value referred to as adoption/rejection α.

Namely, step 1:

an initial value $x^{(0)}$ is determined.

step 2 and thereafter, the following is performed for t=0, 1, . . .

y is generated from a proposed distribution $q(y|x^{(t)})$ and u is generated from a uniform distribution.

When u is less than or equal to $\alpha(x^{(t)}, y)$, $x^{(t+1)}=y$.

Otherwise, $$x^{(t+1)}=x(t) \quad (35)$$

$$\alpha(x^{(t)},y)=\min\{1,\pi(y)q(x|y)/(\pi(x)q(y|x))\} \quad (36)$$

$(x^{(0)}, x^{(1)}, \ldots)$ generated by the MH algorithm forms a Markov chain. The Markov chain has an invariant distribution, irreducibility, and a non-periodic property. Samples after a large m ($x^{(m+1)}$, $x^{(m+2)}$, . . . ) can be regarded to have been sampled from an objective distribution π(x).

In contrast, in the Gibbs sampling, step 1:

a stochastic variable x is divided into k blocks x=(x1, . . . , xk).

step 2 and thereafter, the following is repeated on t=0, 1, . . . .

The individual $x_i^{(t-1)}$ is sampled from a conditional probability.

$$p(x_j|x_1^{(t)},x_{j-1}^{(t)},x_{j+1}^{(t)},\ldots,x_k^{(t)}) \quad (37)$$

As probabilistic prediction 2 (analysis), a state probability in an individual future state may be calculated by using dynamic programming such as a forward algorithm. In the above forward algorithm, model parameters and an observed sequence are given, and a probability distribution of hidden variable states in the last of the sequence is calculated.

According to the example embodiment 5, a future application state can be predicted from an application state that has already been determined.

Example Embodiment 6

Figure 26:
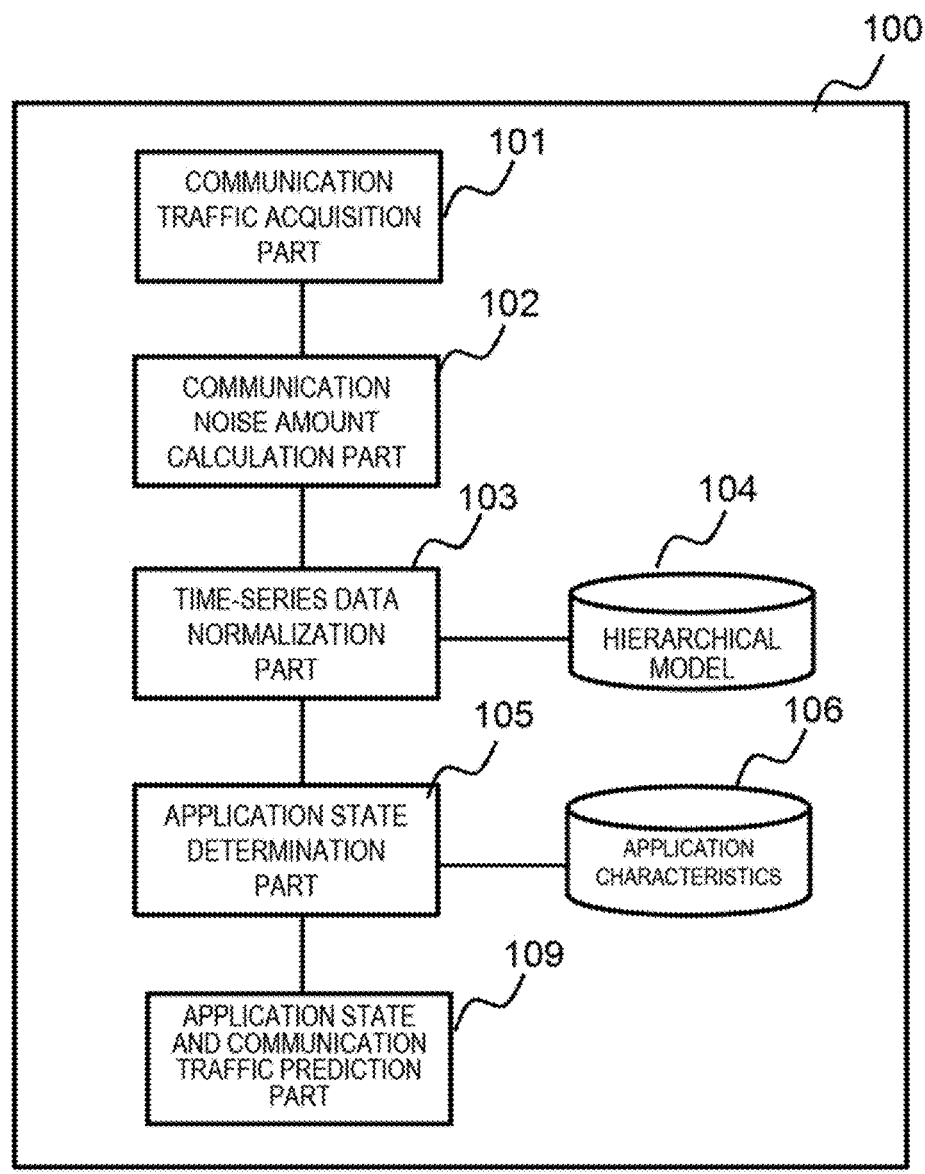
FIG. 26 is a diagram illustrating an example embodiment 6 of the present invention.

FIG. 26 illustrates an example embodiment 6 of the present invention. In the example embodiment 6, in place of the application state prediction part 108 according to the example embodiment 5, an application state and communication traffic prediction part 109 that predicts communication traffic (for example, throughput) by using an application state prediction result is further provided. The application state and communication traffic prediction part 109 is a combination of an application state prediction part and a communication traffic prediction part. The prediction of an application state by the application state and communication traffic prediction part 109 is the same as the prediction method by the application state prediction part 108.

As a prediction method of future communication traffic (for example, throughput) by the application state and communication traffic prediction part 109, a time-series based prediction may be adopted.

The application state and communication traffic prediction part 109 establishes time-series of an AR (Auto Regressive) model of communication traffic (throughput) per application state, for example. In the AR model (AR(p)), an output $y_t$ depends only on past p outputs.

$$y_t=-\Sigma<i=1,p>y_{(t-i)}+\varepsilon_t \quad (38)$$

In the above expression, $\varepsilon_t$ is N(0,Σ) (Gaussian white noise).

The application state and communication traffic prediction part 109 selects a time-series model corresponding to a future application state predicted by the application state prediction part.

The application state and communication traffic prediction part 109 predicts future communication traffic (for example, throughput) from the selected time-series model in accordance with the above expression (38), for example.

As another method, the application state and communication traffic prediction part 109 may predict future communication traffic (throughput) from HMM model parameters. When creating a hierarchical model, the application state and communication traffic prediction part 109 uses an output probability (see expression (3), for example) to express a distribution from which communication traffic (throughput) has been generated. The application state and communication traffic prediction part 109 may predict future communication traffic (for example, throughput) by selecting an output probability corresponding to the application state predicted by the application state prediction part.

Example Embodiment 7

Figure 27:
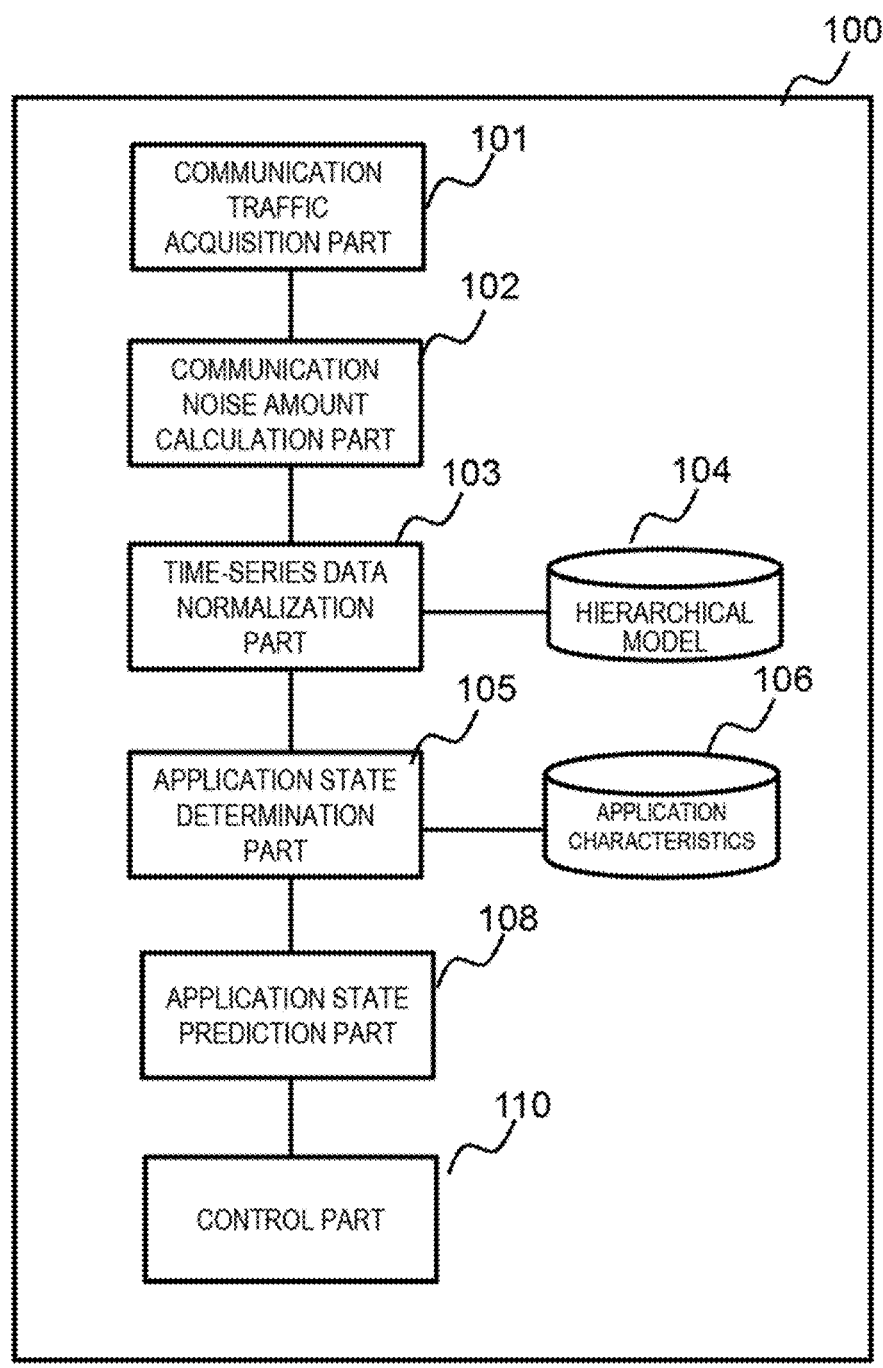
FIG. 27 is a diagram illustrating an example embodiment 7 of the present invention.

FIG. 27 illustrates an example embodiment 7 of the present invention. Referring to FIG. 27, according to the example embodiment 7, in addition to the configuration in FIG. 24, a control part 110 that performs, for example, communication control based on an estimated application state is further provided.

The control part 110 may perform communication control or the like directly. Alternatively, the control part 110 may transmit an instruction for communication control to the network node 20 (an L3 switch, a base station, a gateway, or the like) in FIG. 8A or 8B. In the case of FIG. 8C, the control part 110 directly performs communication control between the terminal 30 and the server 40, for example.

When the network node 20 in FIG. 8A or 8B is a router (an edge router or the like) or when the traffic analysis apparatus 100 includes a router function in FIG. 8C, the control part 110 may control, as network control, traffic shaping or filtering based on an application state. In the traffic shaping, the control part 110 adjusts a rate (transmission interval) in packet transmission to keep the traffic at a constant rate (the control part 110 may perform control for band securement, band limitation, and priority control, for example). In addition, in the filtering, for example, the control part 110 may inspect traffic to perform control in which an individual network connection is allowed or denied based on a specified filtering rule.

When the network node 20 in FIG. 8A or 8B is a base station, when the traffic analysis apparatus 100 in FIG. 8C includes a base station function, or when the traffic analysis apparatus 100 is implemented on a mobile edge computing apparatus, there is a such case in which a radio channel is assigned according to on a radio quality. In this case, radio scheduling may be performed in which a radio channel is preferentially assigned to a terminal indicating a high level of urgency, for example.

Alternatively, the traffic analysis apparatus 100 may be implemented as a traffic detection function (TDF) of a carrier network. TDF may perform analysis of a relationship between traffic and an application state to identify an application corresponding to the traffic. In this case, a PCRF (Policy and Charging Rules Function) may determine a control rule, and a PCEF (Policy and Charging Enforcement Function) or the like may perform control for band control, path modification, etc.

As communication control based on an application state, communication timing (transmission time, and/or transmission interval of packet data, etc.) and compression coding (compression coding scheme, coding rate, frame rate, resolution, etc.) of an encoder (encoding part) not illustrated in a transmission source, a relay station (transcoder), etc. may be controlled.

According to the example embodiment 7, network control, communication control, etc. can be performed based on an application state. According to the example embodiment 7, the application state and communication traffic prediction part 109 in FIG. 26 may be provided in place of the application state prediction part 108.

Example Embodiment 8

Figure 28:
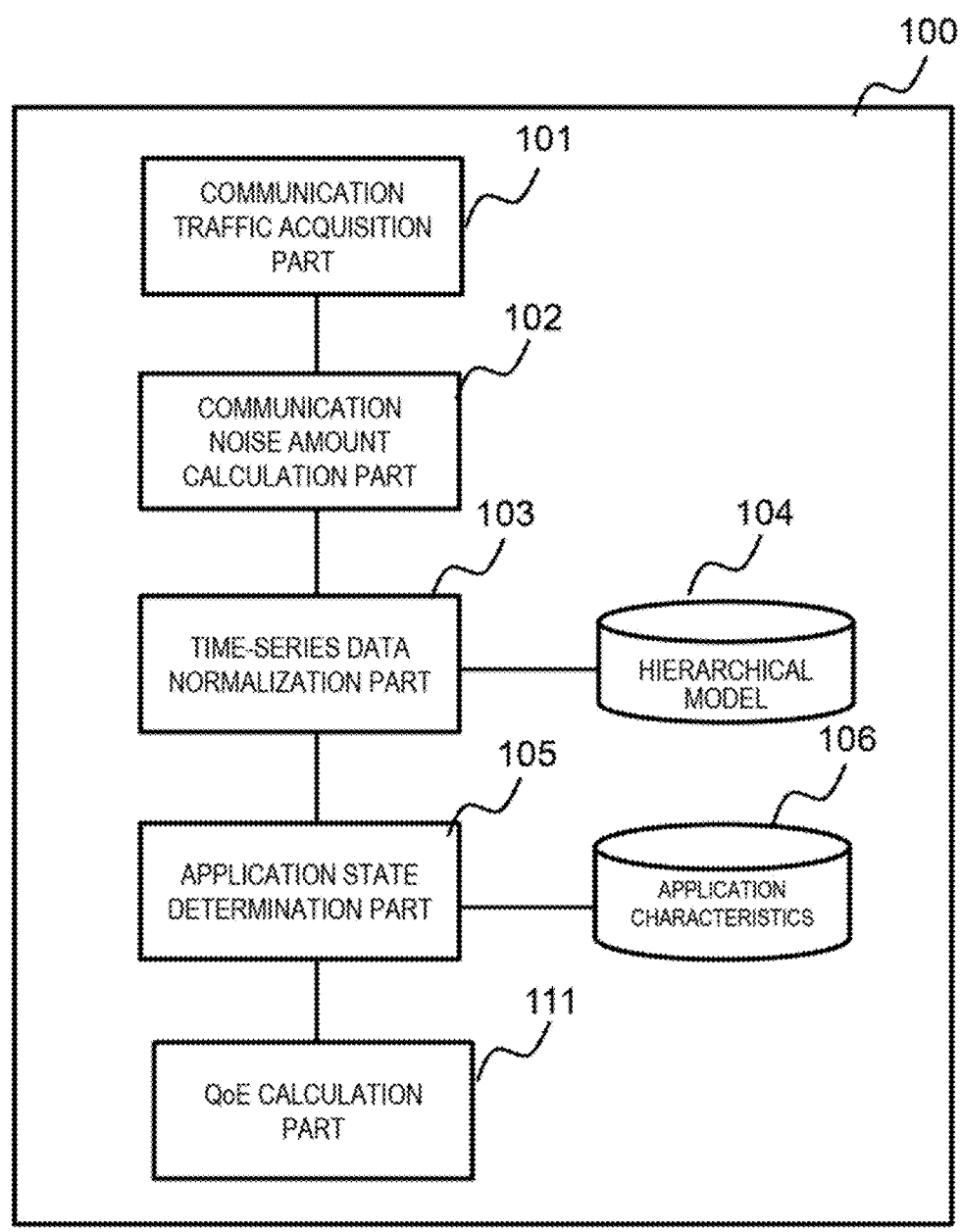
FIG. 28 is a diagram illustrating an example embodiment 8 of the present invention.

FIG. 28 illustrates an example embodiment 8 of the present invention. Referring to FIG. 28, according to the example embodiment 8, a QoE calculation part 111 is provided in addition to the configuration in FIG. 9. The QoE calculation part 111 analyzes communication quality per estimated application state and calculates (evaluates) QoE (Quality of Experience) as application quality (for example: Web QoE, moving image QoE, etc.). A Web page or moving image delivery destination node (a terminal, a server, etc.) may collect a measured QoE and store the QoE in association with the corresponding application state, and the QoE calculation part 111 may determine the QoE corresponding to the communication traffic (throughput) acquired by the communication traffic acquisition part 101 or the application state determined by the application state determination part 105.

As to QoE of a moving image (camera) application, for example, in a case where
moving image is not disrupted, or
moving image is a high definition image,
the QoE calculation part 111 evaluates that the QoE is "good" (4 in a five-point scale). A five-point scale such as excellent, good, fair, poor, and bad is used for QoE, for example. In case of a video, a differential mean opinion score (DMOS) obtained by subtracting mean opinion score (MOS) of a reference video from the MOS of an evaluation target video may be used. MOS of a reference video may be subtracted from MOS of an evaluation target video, and 5 may be added to a subtraction resultant (ACR (Absolute Category Rating)-HRR (Hidden Reference Removal)).

As to QoE of a Web application, for example,
when display is completed quickly after a click, the QoE calculation part 111 may determine that the QoE is "good".

As to QoE of remote machine control (drone, machine tool, or automobile), for example,
when a control command entered from outside quickly arrives at a device or
when a delay is kept constant,
the QoE calculation part 111 may evaluate that the QoE is "good".

As to QoE of a file transfer application, for example,
when transfer is quickly completed,
when transfer does not fail, or the like,
the QoE calculation part 111 may evaluates the QoE highly.

According to the example embodiment 8, QoE corresponding to a determined application state can be determined.

Example Embodiment 9

Figure 29:
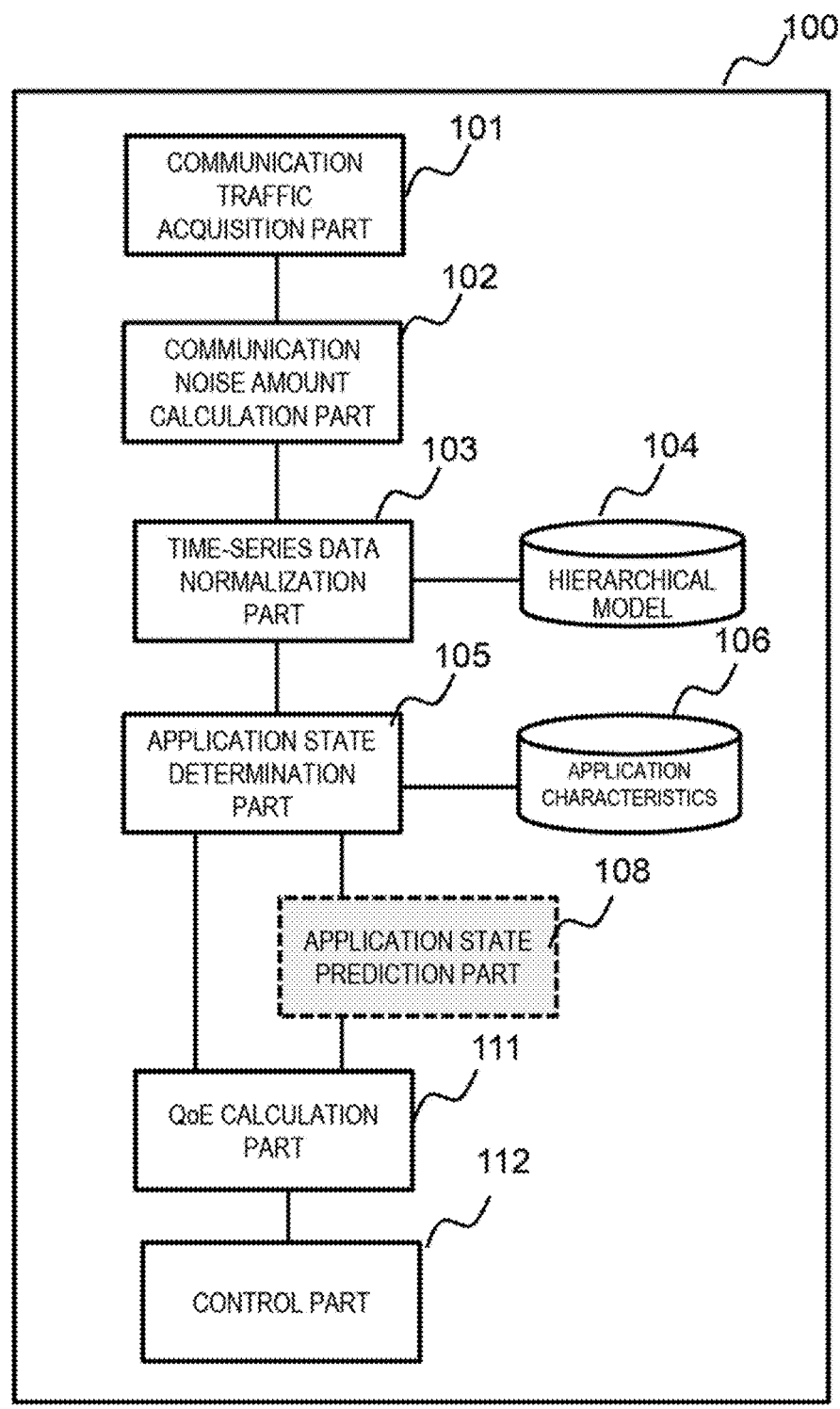
FIG. 29 is a diagram illustrating an example embodiment 9 of the present invention.

FIG. 29 illustrates an example embodiment 9 of the present invention. Referring to FIG. 29, according to the example embodiment 9, a control part 112 is provided in addition to the configuration in FIG. 28. The control part 112 controls an application provided by a telecommunications operator, etc., based on an application quality (QoE) calculated (evaluated) by the QoE calculation part 111. According to the example embodiment 9, the application state prediction part 108 according to the example embodiment 7 (FIG.

27) may be provided, and the QoE calculation part 111 may calculate a QoE corresponding to a predicted future application state.

Though not particularly limited thereto, the control part 112 may perform network control and communication control while prioritizing an application whose QoE calculated by the QoE calculation part 111 is lower. In this way, QoE of an entire system can be improved and smoothed (equalization).

Alternatively, the control part 112 may perform network control and communication control such that the control part 112 drops a priority level of an application when a corresponding QoE exceeds a lower threshold (when a QoE falls below "poor" (2) in the five-point scale, for example). In this way, by lowering a priority level of an application that cannot maintain predetermined application quality (QoE), the quality of an application whose priority level is high can be secured.

If QoE calculated by the QoE calculation part 111 is too good, the control part 112 may perform network control and communication control to lower a priority level of a corresponding application.

Based on the QoE and an application state obtained up to a current time, the QoE calculation part 111 may output a QoE prediction value corresponding to the application state. In this case, the control part 112 can control a priority level of an application based on a prediction value of a future QoE.

According to the example embodiment 9, based on QoE determined or a prediction value of a future QoE, network control and communication control can be performed, and priority control on the corresponding application can be realized.

Exemplary Embodiment 10

Figure 30:
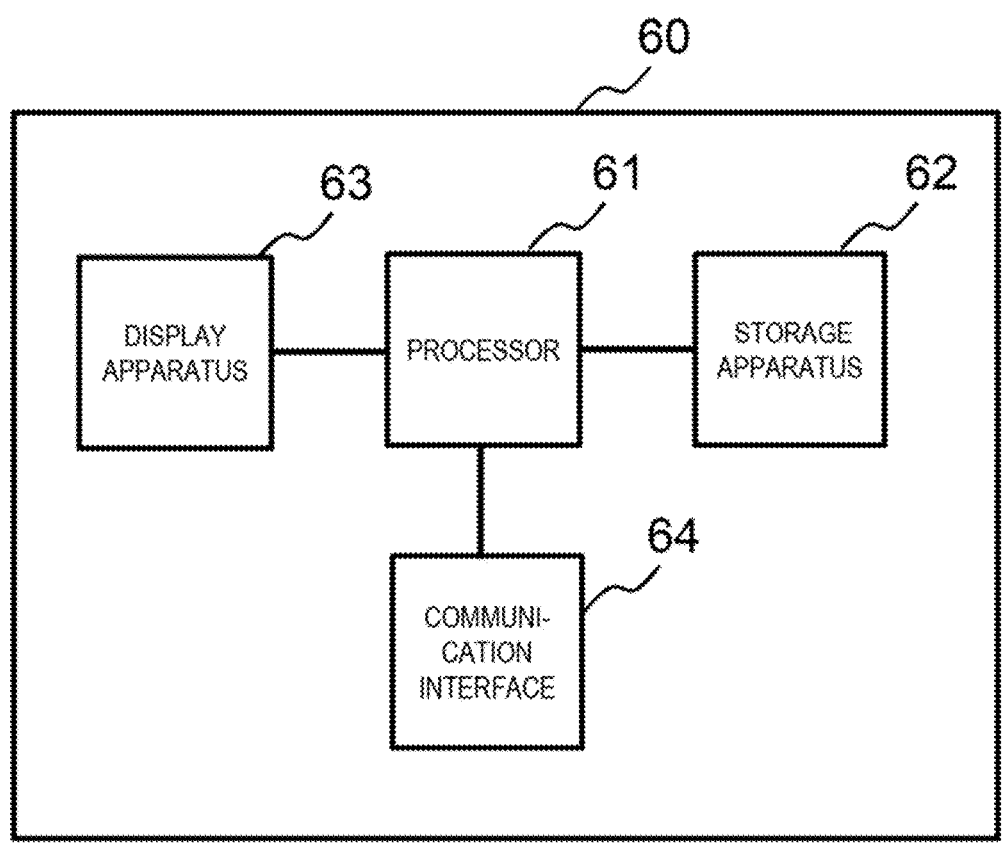
FIG. 30 is a diagram illustrating an example embodiment 10 of the present invention.

FIG. 30 illustrates an example of a configuration in which a traffic analysis apparatus 100 is realized by a computer apparatus 60 as an example embodiment 10 of the present invention. Referring to FIG. 30, the computer apparatus 60 includes a processor (for example, a central processing unit (CPU)) 61, a storage apparatus (memory) 62, a display apparatus 63, and a communication interface 64. The storage apparatus 62 may be, for example, a semiconductor storage such as a RAM, a ROM, or an EEPROM, an HDD, a CD, or a DVD. The storage apparatus 62 holds a program (program instructions, data, etc.) executed by the processor 61. By executing the program stored in the storage apparatus 62, the processor 61 realizes the functions of the traffic analysis apparatus 100 according to the individual example embodiment. The communication interface 64 is an interface that controls communication and connection with the network node 20 in FIG. 8A or 8B. The communication interface 64 may function as a network interface that forwards packets (for example, packets between the terminal 30 and the server 40) flowing through the communication network 50 in FIG. 8C.

The disclosure of each of the above PTL 1 and NPLs 1 and 2 is incorporated herein by reference thereto. Variations and adjustments of the example embodiments and examples are possible within the scope of the overall disclosure (including the claims) of the present invention and based on the basic technical concept of the present invention. Various combinations and selections of various disclosed elements (including the elements in each of the claims, example embodiments, drawings, etc.) are possible within the scope of the claims of the present invention. Namely, the present invention of course includes various variations and modifications that could be made by those skilled in the art according to the overall disclosure including the claims and the technical concept.

The above example embodiments can be noted (but not limited to) as follows.

(Note 1)

A traffic analysis apparatus, including:

a first means that estimates a state sequence from time-series data of communication traffic based on a hidden Markov model, and groups, into one group, a plurality of patterns with resembling state transitions in the state sequence to perform extraction of a state sequence, with taking the plurality of patterns grouped into one group as one state; and a second means that determines an application state corresponding to the time-series data based on the state sequence extracted by the first means and predetermined application characteristics.

(Note 2)

The traffic analysis apparatus according to note 1, including a third means that generates communication noise based on a noise characteristics parameter(s) corresponding to a type of a network through which the communication traffic flows and removing the communication noise from the time-series data of the communication traffic.

(Note 3)

The traffic analysis apparatus according to note 1 or 2; wherein the first means applies a hierarchical hidden Markov model to the time-series data, applies an upper layer of the hierarchical hidden Markov model to a state sequence estimated based on a lower layer of the hierarchical hidden Markov model, groups the states in sections having similar state transition patterns included in the state sequence into a single group, and determines the grouped states to be a single state in the upper layer.

(Note 4)

The traffic analysis apparatus according to note 3; wherein the hierarchical hidden Markov model includes a continuous hidden Markov model as the lower layer and a discrete hidden Markov model as the upper layer.

(Note 5)

The traffic analysis apparatus according to note 3 or 4, including a means that updates the hierarchical hidden Markov model.

(Note 6)

The traffic analysis apparatus according to any one of notes 1 to 4; wherein the second means determines an application state based on a degree of similarity between the time-series data of the communication traffic corresponding to the state sequence extracted by the first means and the communication traffic corresponding to an application state(s) in advance registered.

(Note 7)

The traffic analysis apparatus according to any one of notes 1 to 4; wherein the second means determines an application state based on a degree of similarity between the state sequence extracted by the first means and a sequence(s) of an application state(s) in advance registered.

(Note 8)

The traffic analysis apparatus according to any one of notes 1 to 4; wherein the second means extracts a feature value(s) of the communication traffic, matches the feature value(s) against an application feature value(s) in advance registered, and determines an application state.

(Note 9)

The traffic analysis apparatus according to any one of notes 1 to 4; wherein the second means uses a feature value(s) of communication traffic of an application as training data, performs machine learning to generate a classification model that determines the application, and determines the application state by using the classification model on time-series data of evaluation target communication traffic.
(Note 10)
The traffic analysis apparatus according to any one of notes 1 to 9; wherein the first means removes communication noise by using an HMM model that takes into account a state duration time distribution (Explicit-Duration HMM).
(Note 11)
The traffic analysis apparatus according to any one of notes 1 to 10, including
a means that predicts a future application state by using some application states that have already been determined.
(Note 12)
The traffic analysis apparatus according to any one of notes 1 to 10, including
a means that predicts future communication traffic by using some application states that have already been determined.
(Note 13)
The traffic analysis apparatus according to any one of notes 1 to 12, including
a means that performs at least one of network control and communication control based on an estimated application state(s).
(Note 14)
The traffic analysis apparatus according to any one of notes 1 to 13, including
a means that determines an application quality (QoE) based on the application state(s).
(Note 15)
The traffic analysis apparatus according to any one of notes 1 to 14, including
a means that performs at least one of network control and communication control based on the application state(s) or a prediction result(s) of the future application state(s).
(Note 16)
A traffic analysis method, including:
estimating a state sequence from time-series data of communication traffic based on a hidden Markov model, and grouping, into one group, a plurality of patterns with resembling state transitions in the state sequence to perform extraction of a state sequence, with taking the plurality of patterns grouped into one group as one state; and
determining an application state corresponding to the time-series data based on the state sequence extracted and predetermined application characteristics.
(Note 17)
The traffic analysis method according to note 16, including generating communication noise based on a noise characteristics parameter(s) corresponding to a type of a network through which the communication traffic flows and removing the communication noise from the time-series data of the communication traffic.
(Note 18)
The traffic analysis method according to note 16 or 17, including applying a hierarchical hidden Markov model to the time-series data, applying an upper layer of the hierarchical hidden Markov model to a state sequence estimated based on a lower layer of the hierarchical hidden Markov model, integrating the states in sections having similar state transition patterns included in the state sequence into a single group, and determining the grouped states to be a single state in the upper layer.
(Note 19)
The traffic analysis method according to note 18; wherein the hierarchical hidden Markov model includes a continuous hidden Markov model as the lower layer and a discrete hidden Markov model as the upper layer.
(Note 20)
The traffic analysis method according to note 18 or 19, including updating the hierarchical hidden Markov model.
(Note 21)
The traffic analysis method according to any one of notes 16 to 19, including determining an application state based on a degree of similarity between the time-series data of the communication traffic corresponding to the state sequence extracted and the communication traffic corresponding to an application state(s) in advance registered.
(Note 22)
The traffic analysis method according to any one of notes 16 to 19, including determining an application state based on a degree of similarity between the state sequence extracted and a sequence(s) of an application state(s) in advance registered.
(Note 23)
The traffic analysis method according to any one of notes 16 to 19, including extracting a feature value(s) of the communication traffic, matching the feature value(s) against an application feature value(s) in advance registered, and determining an application state.
(Note 24)
The traffic analysis method according to any one of notes 16 to 19, including using a feature value(s) of communication traffic of an application as training data, performing machine learning to generate a classification model that determines the application, and determining the application state by using the classification model on time-series data of evaluation target communication traffic.
(Note 25)
The traffic analysis method according to any one of notes 16 to 24, including removing communication noise by using an HMM model that takes into account a state duration time distribution (Explicit-Duration HMM).
(Note 26)
The traffic analysis method according to any one of notes 16 to 25, including means for predicting a future application state by using some application states that have already been determined.
(Note 27)
The traffic analysis method according to any one of notes 16 to 25, including means for predicting future communication traffic by using some application states that have already been determined.
(Note 28)
The traffic analysis method according to any one of notes 16 to 27, including means for performing at least one of network control and communication control based on an estimated application state(s).
(Note 29)
The traffic analysis method according to any one of notes 16 to 28, including means for determining application quality (QoE) based on the application state(s).
(Note 30)
The traffic analysis method according to any one of notes 16 to 26, including means for performing at least one of network control and communication control based on the application state(s) or a prediction result(s) of the future application state(s).

(Note 31)
A program, causing a computer to execute
a first processing for estimating a state sequence from time-series data of communication traffic based on a hidden Markov model, and grouping, into one group, a plurality of patterns with resembling state transitions in the state sequence to perform extraction of a state sequence, with taking the plurality of patterns grouped into one group as one state; and
a second processing for determining an application state corresponding to the time-series data based on the state sequence extracted and predetermined application characteristics.

(Note 32)
The program according to note 31, causing the computer to execute
a third processing for generating communication noise based on a noise characteristics parameter(s) corresponding to a type of a network through which the communication traffic flows and removing the communication noise from the time-series data of the communication traffic.

(Note 33)
The program according to note 31 or 32; wherein the first processing applies a hierarchical hidden Markov model to the time-series data, applies an upper layer of the hierarchical hidden Markov model to a state sequence estimated based on a lower layer of the hierarchical hidden Markov model, groups the states in sections having similar state transition patterns included in the state sequence into a single group, and determines the grouped states to be a single state in the upper layer.

(Note 34)
The program according to note 33; wherein the hierarchical hidden Markov model includes a continuous hidden Markov model as the lower layer and a discrete hidden Markov model as the upper layer.

(Note 35)
The program according to note 33 or 34, causing the computer to execute a processing for updating the hierarchical hidden Markov model.

(Note 36)
The program according to any one of notes 31 to 34; wherein the second processing determines an application state based on a degree of similarity between the time-series data of the communication traffic corresponding to the state sequence extracted by the first processing and the communication traffic corresponding to an application state(s) in advance registered.

(Note 37)
The program according to any one of notes 31 to 34; wherein the second processing determines an application state based on a degree of similarity between the state sequence extracted by the first processing and a sequence(s) of an application state(s) in advance registered.

(Note 38)
The program according to any one of notes 31 to 34; wherein the second processing extracts a feature value(s) of the communication traffic, matches the feature value(s) against an application feature value(s) in advance registered, and determines an application state.

(Note 39)
The program according to any one of notes 31 to 34; wherein the second processing uses a feature value(s) of communication traffic of an application as training data, performs machine learning to generate a classification model that determines the application, and determines the application state by using the classification model on time-series data of evaluation target communication traffic.

(Note 40)
The program according to any one of notes 31 to 39; wherein the first processing removes communication noise by using an HMM model that takes into account a state duration time distribution (Explicit-Duration HMM).

(Note 41)
The program according to any one of notes 31 to 40, causing the computer to execute a processing for predicting a future application state by using some application states that have already been determined.

(Note 42)
The program according to any one of notes 31 to 40, causing the computer to execute a processing for predicting future communication traffic by using some application states that have already been determined.

(Note 43)
The program according to any one of notes 31 to 42, causing the computer to execute a processing for performing at least one of network control and communication control based on an estimated application state(s).

(Note 44)
The program according to any one of notes 31 to 43, causing the computer to execute a processing for determining application quality (QoE) based on the application state(s).

(Note 45)
The program according to any one of notes 31 to 44, causing the computer to execute a processing for performing at least one of network control and communication control based on the application state(s) or a prediction result(s) of the future application state(s).

What is claimed is:
1. A traffic analysis apparatus, comprising:
a processor; and
a memory in circuit communication with the processor,
wherein the processor, when executing program instructions stored on the memory;
estimates a state sequence from time-series data of communication traffic based on a continuous hidden Markov model as a lower layer of a hierarchical hidden Markov model;
applies a discrete hidden Markov model as an upper layer of a hierarchical hidden Markov model to the state sequence estimated based on the continuous hidden Markov model; groups a plurality of states in a segment having resembling state transition patterns in the estimated state sequence;
assigns one state of the discrete hidden Markov model to the plurality of states grouped into one group to perform extraction of a state sequence, based on the discrete hidden Markov model with the plurality of patterns grouped into the one group as the one state;
extracts a feature value of the communication traffic, based on the state sequence extracted based on the discrete hidden Markov model, and
collates the feature value with one or more application feature values registered in advance to determine an application state corresponding to the time-series data.

2. The traffic analysis apparatus according to claim 1, wherein the processor, when executing the program instructions stored on the memory,
generates communication noise by using an inverse function of a cumulative distribution function, based on a noise characteristic parameter corresponding to a type of a network through which the communication traffic flows and subtracts the communication noise from the time-series data of the communication traffic.

3. The traffic analysis apparatus according to claim 1, wherein the processor, when executing the program instructions stored on the memory,
updates the hierarchical hidden Markov model.

4. The traffic analysis apparatus according to claim 1, wherein the processor, when executing the program instructions stored on the memory, determines an application state based on a degree of similarity between the time-series data of the communication traffic corresponding to the state sequence extracted and the communication traffic corresponding to an application state in advance registered.

5. The traffic analysis apparatus according to claim 1, wherein the processor, when executing the program instructions stored on the memory, determines an application state based on a degree of similarity between the state sequence extracted and a sequence of an application state in advance registered.

6. The traffic analysis apparatus according to claim 1, wherein the processor, when executing the program instructions stored on the memory, uses a feature value of communication traffic of an application as training data, performs machine learning to generate a classification model that determines the application, and determines the application state by using the classification model on time-series data of evaluation target communication traffic.

7. The traffic analysis apparatus according to claim 1, wherein the processor, when executing the program instructions stored on the memory, uses the continuous hidden Markov model as the lower layer of the hierarchical hidden Markov model and an EDHMM (Explicit-Duration) type discrete hidden Markov model as the upper layer of the hierarchical hidden Markov model.

8. The traffic analysis apparatus according to claim 1, wherein the processor, when executing the program instructions stored on the memory,
predicts a future application state by using a plurality of application states that have already been determined.

9. The traffic analysis apparatus according to claim 1, wherein the processor, when executing the program instructions stored on the memory,
predicts future communication traffic by using a plurality of application states that have already been determined.

10. The traffic analysis apparatus according to claim 1, wherein the processor, when executing the program instructions stored on the memory,
performs at least one of network control and communication control based on an estimated application state.

11. The traffic analysis apparatus according to claim 1, wherein the processor, when executing the program instructions stored on the memory,
determines application quality (QoE) based on the application state.

12. The traffic analysis apparatus according to claim 1, wherein the processor, when executing the program instructions stored on the memory,
performs at least one of network control and communication control based on the application state or a prediction result of the future application state.

13. A computer-based traffic analysis method, comprising:
estimating a state sequence from time-series data of communication traffic based on a continuous hidden Markov model as a lower layer of a hierarchical hidden Markov model;
applying a discrete hidden Markov model as an upper layer of a hierarchical hidden Markov model to the state sequence estimated based on the continuous hidden Markov model;
grouping, a plurality of states in a segment having with resembling state transition patterns in the estimated state sequence;
assigning one state of the discrete hidden Markov model to the plurality of states grouped into one group to perform extraction of a state sequence, based on the discrete hidden Markov model with the plurality of patterns grouped into the one group as the one state;
extracting a feature value of the communication traffic, based on the state sequence extracted based on the discrete hidden Markov model, and
collating the feature value with one or more application feature values registered in advance to determine an application state corresponding to the time-series data.

14. A non-transitory computer-readable medium storing a program causing a computer to execute processing comprising:
estimating a state sequence from time-series data of communication traffic based on a continuous hidden Markov model as a lower layer of a hierarchical hidden Markov model
applying a discrete hidden Markov model as an upper layer of a hierarchical hidden Markov model to the state sequence estimated based on the continuous hidden Markov model;
grouping, a plurality of states in a segment having resembling state transition patterns in the estimated state sequence;
assigning one state of the discrete hidden Markov model to the plurality of states grouped into one group to perform extraction of a state sequence, based on the discrete hidden Markov model with the plurality of patterns grouped into the one group as the one state; and
extracting a feature value of the communication traffic, based on the state sequence extracted based on the discrete hidden Markov model, and
collating the feature value with one or more application feature values registered in advance to determine an application state corresponding to the time-series data.

* * * * *